(12) United States Patent  
Sugiura et al.

(10) Patent No.: US 12,253,114 B2  
(45) Date of Patent: Mar. 18, 2025

(54) GEARED MOTOR AND CLUTCH ACTUATOR USING SAME

(71) Applicant: DENSO CORPORATION, Kariya (JP)

(72) Inventors: Takumi Sugiura, Kariya (JP); Atsuhiro Furuichi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/531,105

(22) Filed: Dec. 6, 2023

(65) Prior Publication Data

US 2024/0102516 A1 Mar. 28, 2024

Related U.S. Application Data

(63) Continuation of application No. PCT/JP2022/024303, filed on Jun. 17, 2022.

(30) Foreign Application Priority Data

Jun. 30, 2021 (JP) .................................. 2021-108818  
Aug. 31, 2021 (JP) .................................. 2021-141589

(51) Int. Cl.  
*F16D 23/12* (2006.01)  
*F16D 28/00* (2006.01)  
(Continued)

(52) U.S. Cl.  
CPC .............. *F16D 23/12* (2013.01); *F16D 28/00* (2013.01); *F16H 1/28* (2013.01); *F16H 57/082* (2013.01);  
(Continued)

(58) Field of Classification Search  
CPC ...... F16H 1/28–2836; F16H 57/08–2057/085; F16D 2023/123; F16D 28/00; H02K 7/116  
See application file for complete search history.

(56) References Cited

U.S. PATENT DOCUMENTS 5,853,346 A * 12/1998 Gaffney ................ F16H 1/2818  
475/331  
9,534,663 B2 * 1/2017 Hirota ..................... F16D 13/54  
(Continued)

FOREIGN PATENT DOCUMENTS

DE 4445413 A1 * 7/1996 ............... F16H 1/28  
JP 2004092815 A 3/2004  
(Continued)

OTHER PUBLICATIONS

U.S. Appl. No. 18/530,401 to Tomonori Suzuki et al., filed Dec. 6, 2023 (54 pages).  
(Continued)

*Primary Examiner* — James J Taylor, II  
(74) *Attorney, Agent, or Firm* — Nixon & Vanderhye P.C.

(57) ABSTRACT

A planetary gear has: a first planetary gear annular surface formed at one axial end of the planetary gear and a second planetary gear annular surface formed at another axial end of the planetary gear. A sun gear has a sun gear annular surface that is opposed to the first planetary gear annular surface. A second ring gear has an output-side annular surface that is opposed to the second planetary gear annular surface. A relative movement of a carrier subassembly relative to a housing in an axial direction is limited when the first planetary gear annular surface abuts against the sun gear annular surface or when the second planetary gear annular surface abuts against the output-side annular surface.

9 Claims, 15 Drawing Sheets

(51) Int. Cl.
*F16H 1/28* (2006.01)
*F16H 57/08* (2006.01)

(52) U.S. Cl.
CPC ...... *F16D 2023/123* (2013.01); *F16H 1/2836* (2013.01); *F16H 2057/085* (2013.01)

(56) References Cited

U.S. PATENT DOCUMENTS

| | | | |
|---|---|---|---|
| 10,479,199 B2* | 11/2019 | Niimura | ................ F16D 13/52 |
| 11,137,069 B2* | 10/2021 | Appeltauer | ........... F16H 63/304 |
| 2022/0128102 A1 | 4/2022 | Uchida et al. | |
| 2022/0136568 A1 | 5/2022 | Hayashi et al. | |
| 2022/0145939 A1 | 5/2022 | Takagi et al. | |
| 2022/0145940 A1 | 5/2022 | Ishibashi et al. | |
| 2022/0145941 A1 | 5/2022 | Sugiura et al. | |
| 2022/0145942 A1 | 5/2022 | Hayashi et al. | |
| 2022/0145943 A1 | 5/2022 | Uchida et al. | |
| 2022/0145944 A1 | 5/2022 | Sugiura | |
| 2022/0145945 A1 | 5/2022 | Sugiura | |
| 2022/0145946 A1 | 5/2022 | Ishibashi et al. | |
| 2023/0202018 A1* | 6/2023 | Taylor | .................... B25B 21/02 |
| | | | 173/216 |

FOREIGN PATENT DOCUMENTS

| | | | |
|---|---|---|---|
| JP | 2006090533 A | | 4/2006 |
| WO | 2023276727 A1 | | 1/2023 |
| WO | 2023276728 A1 | | 1/2023 |
| WO | 2023276729 A1 | | 1/2023 |

OTHER PUBLICATIONS

U.S. Appl. No. 18/529,797 to Tomonori Suzuki et al., filed Dec. 5, 2023 (52 pages).

U.S. Appl. No. 18/532,909 to Hirohisa Noda et al., filed Dec. 7, 2023 (48 pages).

* cited by examiner

GEARED MOTOR AND CLUTCH ACTUATOR USING SAME

CROSS REFERENCE TO RELATED APPLICATIONS

This application is a continuation application of International Patent Application No. PCT/JP2022/024303 filed on Jun. 17, 2022, which designated the U.S. and claims the benefit of priority from Japanese Patent Application No. 2021-108818 filed on Jun. 30, 2021 and Japanese Patent Application No. 2021-141589 filed on Aug. 31, 2021. The entire disclosures of all of the above applications are incorporated herein by reference.

TECHNICAL FIELD

The present disclosure relates to a geared motor and a clutch actuator using the same.

BACKGROUND

A clutch actuator capable of shifting a state of a clutch has been previously proposed. The clutch is installed between a first transmission element and a second transmission element which can make relative rotation therebetween, and the state of the clutch is shiftable between: a coupled state where transmission of a torque between the first transmission element and the second transmission element is enabled; and a decoupled state where the transmission of the torque between the first transmission element and the second transmission element is blocked.

SUMMARY

This section provides a general summary of the disclosure, and is not a comprehensive disclosure of its full scope or all of its features.

According to one aspect of the present disclosure, there is provided a geared motor that includes a housing, an electric motor, a speed reducer, and a rotary element. The electric motor is installed to the housing and is configured to output a torque of rotation in response to supply of an electric power to the electric motor. The speed reducer is configured to output the torque of the rotation transmitted from the electric motor after reducing a rotational speed of the rotation. The rotary element is configured to be rotated by the torque transmitted from the speed reducer. The speed reducer includes a sun gear, a plurality of planetary gears, a plurality of pins, a plurality of planetary gear bearings, a carrier, a first ring gear and a second ring gear. The sun gear is configured to receive the torque transmitted from the electric motor. The plurality of planetary gears are configured to mesh with the sun gear. Each of the plurality of pins is installed at a rotational center of a corresponding one of the plurality of planetary gears. Each of the plurality of planetary gear bearings is installed between a corresponding one of the plurality of planetary gears and a corresponding one of the plurality of pins. The carrier is shaped in an annular form and is rotatable relative to the sun gear. The carrier supports one end portion of each of the plurality of pins and thereby rotatably supports each of the plurality of planetary gears. The first ring gear is shaped in an annular form and is configured to mesh with the plurality of planetary gears. The second ring gear is shaped in an annular form and is configured to mesh with the plurality of planetary gears. The plurality of planetary gears, the plurality of pins, the plurality of planetary gear bearings and the carrier form a carrier subassembly. At least one planetary gear among the plurality of planetary gears has a first planetary gear annular surface and a second planetary gear annular surface. The first planetary gear annular surface is an annular surface formed at one axial end of the at least one planetary gear. The second planetary gear annular surface is an annular surface formed at another axial end of the at least one planetary gear that is opposite to the one axial end of the at least one planetary gear. The sun gear has a sun gear annular surface that is an annular surface and is opposed to the first planetary gear annular surface such that a portion of the sun gear annular surface is abuttable against and is slidable relative to a portion of the first planetary gear annular surface. One of the second ring gear and the rotary element has an output-side annular surface that is an annular surface and is opposed to the second planetary gear annular surface such that a portion of the output-side annular surface is abuttable against and is slidable relative to a portion of the second planetary gear annular surface. A relative movement of the carrier subassembly relative to the housing in an axial direction is limited when the first planetary gear annular surface abuts against the sun gear annular surface or when the second planetary gear annular surface abuts against the output-side annular surface.

According to another aspect of the present disclosure, there is provided a clutch actuator that includes the geared motor described above and a rotation-to-translation converter. The rotation-to-translation converter includes the rotary element and is configured to convert a rotating motion of the rotary element into a translating motion that is a relative movement relative to the housing in the axial direction to shift the state of the clutch to the coupled state or the decoupled state.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
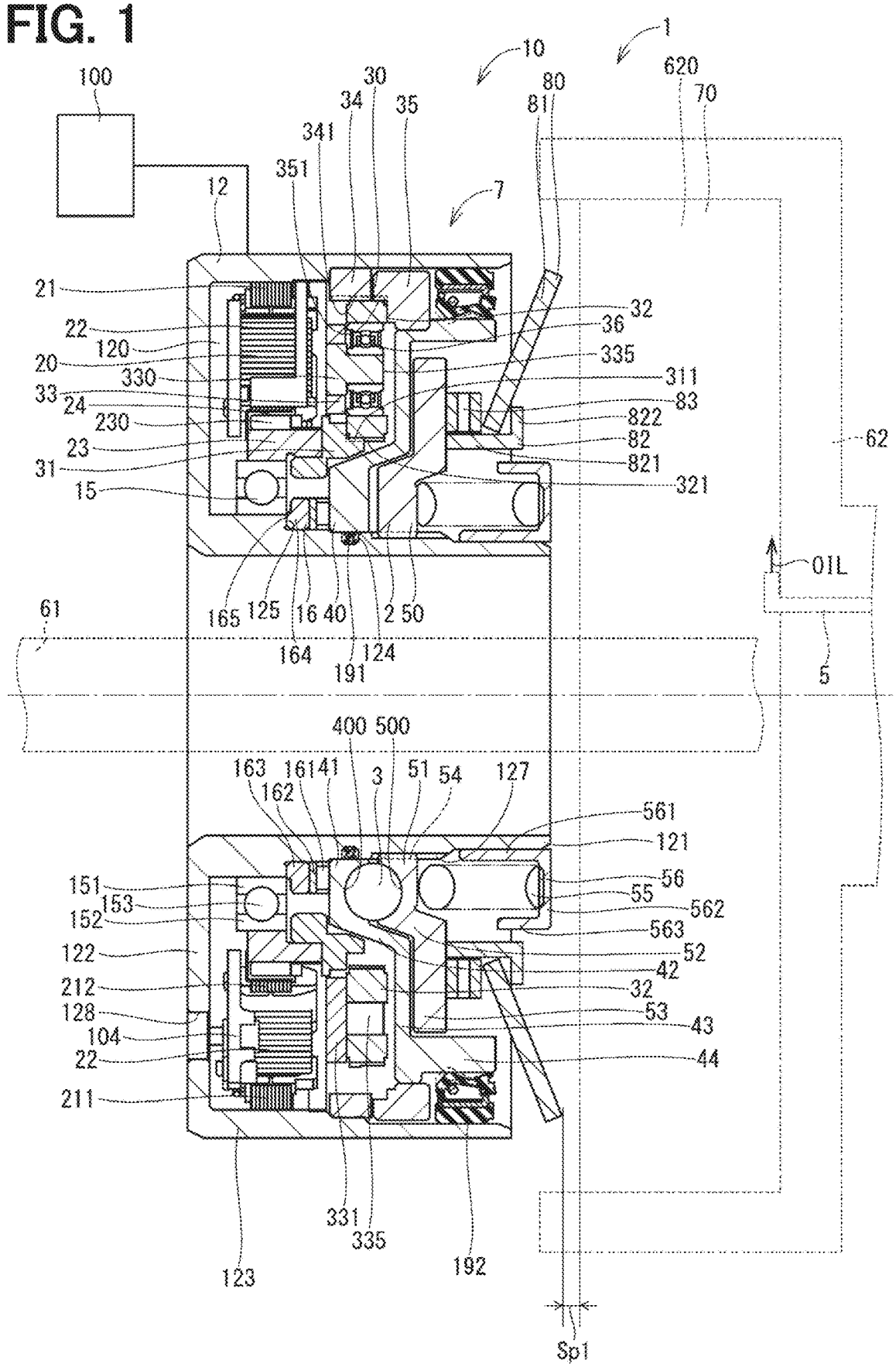
FIG. 1 is a cross-sectional view of a clutch device to which a geared motor and a clutch actuator according to a first embodiment are applied.

A clutch actuator capable of shifting a state of a clutch has been previously proposed. The clutch is installed between a first transmission element and a second transmission element which can make relative rotation therebetween, and the state of the clutch is shiftable between: a coupled state where transmission of a torque between the first transmission element and the second transmission element is enabled; and a decoupled state where the transmission of the torque between the first transmission element and the second transmission element is blocked.

A previously proposed clutch actuator of this type includes a geared motor that serves as a drive device for urging the clutch. The geared motor includes an electric motor and a speed reducer. The speed reducer is configured to output a torque of rotation transmitted from the electric motor after reducing a rotational speed of the rotation. The speed reducer includes a sun gear, a plurality of planetary gears and two ring gears.

In the previously proposed geared motor described above, an axial position of a carrier subassembly, which includes the planetary gears, pins and a carrier, is limited between components (a position limiting arrangement) which are synchronized with the carrier and the sun gear, and relatively large relative rotation is generated at the position limiting arrangement. Therefore, a sliding speed of the carrier subassembly and the position limiting components becomes relatively high. When the torque is applied to the speed reducer of the geared motor during the process of urging the clutch, the planetary gears are tilted. Thereby, the load is applied to the entire carrier in the axial direction. Therefore, the position limiting arrangement for limiting the axial position may be subject to severe wear due to the sliding stress. Here, the sliding stress corresponds to the product of sliding distance and the load in the axial direction.

The following measures can be taken to reduce the amount of wear: (1) reduction of the sliding stress, i.e., reduction of the sliding distance or the axial load, and (2) improvement of the specific wear. However, the configuration of the previously proposed geared motor described above cannot reduce (1) the sliding stress, and (2) the improvement of the specific wear requires heat treatment at least for the carrier, which may make the manufacturing process more complex. Furthermore, when the entire carrier subassembly is supported with the bearing(s) or the like, the above-mentioned disadvantage may possibly be solved. However, it may lead to a larger body size.

Furthermore, in the previously proposed geared motor described above, since the frictional force is generated at the position limiting arrangement, the effective ratio of the entire speed reducer becomes lower than a theoretical efficiency which is based only on a meshing efficiency, and thereby the performance of the clutch actuator may be deteriorated. Therefore, for example, at the time of coupling the clutch, an extra torque of the electric motor needs to be outputted to compensate for the loss of efficiency. Thus, the electric current and the electric power consumption may possibly be increased, and the amount of heat generated by the electric motor may possibly be increased. This may deteriorate the reliability of the clutch actuator.

A geared motor of the present disclosure includes a housing, an electric motor, a speed reducer and a rotary element. The electric motor is installed to the housing and is configured to output a torque of rotation in response to supply of an electric power to the electric motor. The speed reducer is configured to output the torque of the rotation transmitted from the electric motor after reducing a rotational speed of the rotation. The rotary element is configured to be rotated by the torque transmitted from the speed reducer.

The speed reducer includes a sun gear, a plurality of planetary gears, a plurality of pins, a plurality of planetary gear bearings, a carrier shaped in an annular form, a first ring gear shaped in an annular form and a second ring gear shaped in an annular form. The sun gear is configured to receive the torque transmitted from the electric motor. The plurality of planetary gears are configured to mesh with the sun gear, and each of the plurality of planetary gears is configured to rotate and revolve around the sun gear in a circumferential direction of the sun gear. Each of the plurality of pins is installed at a rotational center of a corresponding one of the plurality of planetary gears.

Each of the plurality of planetary gear bearings is installed between a corresponding one of the plurality of planetary gears and a corresponding one of the plurality of pins. The carrier supports one end portion of each of the plurality of pins and thereby rotatably supports each of the plurality of planetary gears, and the carrier is rotatable relative to the sun gear. The first ring gear is configured to mesh with the plurality of planetary gears. The second ring gear is configured to mesh with the plurality of planetary gears. A number of teeth of the second ring gear is different from a number of teeth of the first ring gear, and the second ring gear is configured to output the torque to the rotary element.

The plurality of planetary gears, the plurality of pins, the plurality of planetary gear bearings and the carrier form a carrier subassembly. At least one planetary gear among the plurality of planetary gears has: a first planetary gear annular surface which is an annular surface formed at one axial end of the at least one planetary gear; and a second planetary gear annular surface which is an annular surface formed at another axial end of the at least one planetary gear that is opposite to the one axial end of the at least one planetary gear. The sun gear has a sun gear annular surface that is an annular surface and is opposed to the first planetary gear annular surface such that a portion of the sun gear annular surface is abuttable against and is slidable relative to a portion of the first planetary gear annular surface. One of the second ring gear and the rotary element has an output-side annular surface that is an annular surface and is opposed to the second planetary gear annular surface such that a portion of the output-side annular surface is abuttable against and is slidable relative to a portion of the second planetary gear annular surface.

A relative movement of the carrier subassembly relative to the housing in an axial direction is limited when the first planetary gear annular surface abuts against the sun gear annular surface or when the second planetary gear annular surface abuts against the output-side annular surface.

In the present disclosure, the position of the carrier subassembly in the axial direction can be limited by the sun gear annular surface of the sun gear and the output-side annular surface of the one of the second ring gear and the rotary element. Here, the sliding speed between the first planetary gear annular surface and the sun gear annular surface and the sliding speed between the second planetary gear annular surface and the output-side annular surface are very low in comparison to the sliding speed between the carrier subassembly and the position limiting component of the previously proposed geared motor described above. Therefore, the sliding distance between the first planetary gear annular surface and the sun gear annular surface and the sliding distance between the second planetary gear annular surface and the output-side annular surface can be significantly reduced to significantly reduce the sliding stress. Therefore, the amount of wear of the at least one planetary gear, the sun gear, the second ring gear or the rotary element can be reduced, and the wear resistance can be improved.

Furthermore, it is possible to reduce the torque loss between: the carrier subassembly; and the sun gear and the second ring gear (serving as the position limiting components). Therefore, the overall efficiency of the speed reducer can be improved.

Hereinafter, a plurality of embodiments of a clutch actuator will be described with reference to the drawings. The same reference signs are given to substantially the same portions among the embodiments, and the redundant description thereof will be omitted for the sake of simplicity.

First Embodiment

Figure 2:
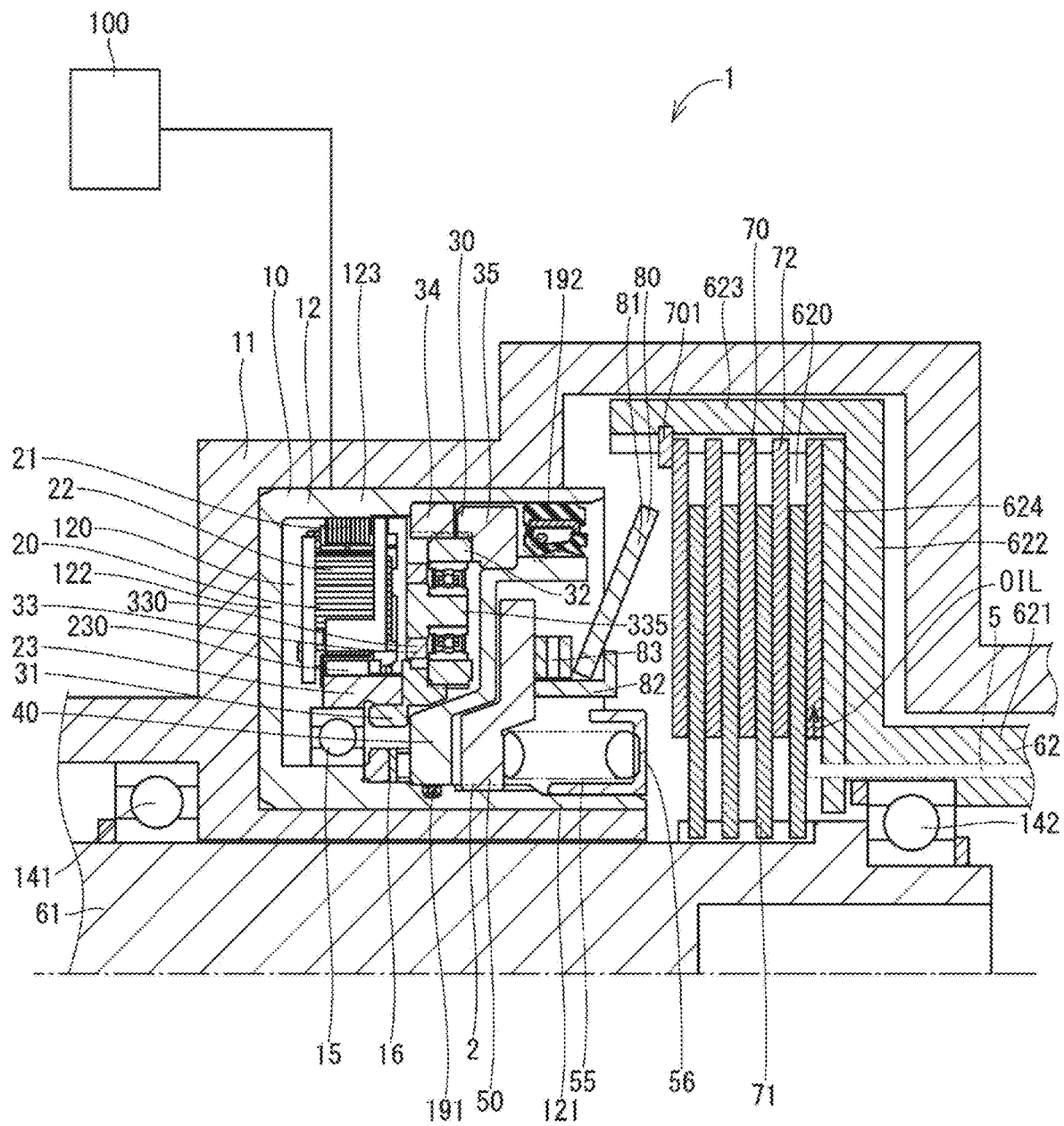
FIG. 2 is a cross-sectional view showing a portion of the geared motor, a portion of the clutch actuator and a portion of the clutch device according to the first embodiment.

FIGS. 1 and 2 show a clutch device to which a geared motor and a clutch actuator of a first embodiment are applied. The clutch device 1 is installed between, for example, an internal combustion engine and a transmission ((also called a gearbox) of a vehicle to enable or disable transmission of a torque between the internal combustion engine and the transmission.

The clutch device 1 includes: a clutch actuator 10; a clutch 70; an electronic control unit (hereinafter referred to as ECU) 100, which serves as a controller unit; an input shaft 61, which serves as a first transmission element; and an output shaft 62, which serves as a second transmission element.

The clutch actuator 10 includes: a housing 12; an electric motor 20, which serves as a prime mover; a speed reducer 30; and a torque cam 2, which serves as a rotation-to-translation converter or a rotatable-element cam. Here, the housing 12, the electric motor 20, the speed reducer 30 and a drive cam 40 (serving as a portion of the torque cam 2 described later) form a geared motor 7.

The ECU 100 is a small computer that has a CPU (serving as a computing unit), a ROM and a RAM (serving as a storage unit) and an input/output device (serving as an input/output unit). The ECU 100 performs calculations based on information (e.g., signals from various sensors installed in various parts of the vehicle) and controls operations of various devices and equipment of the vehicle according to a program(s) stored in, for example, the ROM. As described above, the ECU 100 executes the program(s) stored in the non-transitory tangible storage medium. When the program is executed, a method, which corresponds to the program, is executed.

The ECU 100 is configured to control the operation of the internal combustion engine and the like according to the information (e.g., the signals from the various sensors). Furthermore, the ECU 100 is also configured to control the operation of the electric motor 20 described later.

The input shaft 61 is connected to, for example, a drive shaft (not shown) of the internal combustion engine and is rotatable integrally with the drive shaft. That is, a torque is inputted to the input shaft 61 from the drive shaft.

A fixing body 11 (see FIG. 2) is installed to the vehicle having the internal combustion engine. The fixing body 11 is shaped in, for example, a tubular form and is securely mounted in an engine compartment of the vehicle. A ball bearing 141 is installed between an inner peripheral wall of the fixing body 11 and an outer peripheral wall of the input shaft 61. Therefore, the input shaft 61 is rotatably supported by the fixing body 11 through the ball bearing 141.

The housing 12 is installed between the inner peripheral wall of the fixing body 11 and the outer peripheral wall of the input shaft 61. The housing 12 includes a housing inner tubular portion (serving as a housing tubular portion) 121, a housing plate portion 122, a housing outer tubular portion 123, a seal groove 124, a housing step surface 125, a plurality of housing-side spline grooves 127 and a housing hole 128.

The housing inner tubular portion 121 is shaped generally in a cylindrical tubular form. The housing plate portion 122 is shaped in an annular plate form such that the housing plate portion 122 radially outwardly extends from an end portion of the housing inner tubular portion 121. The housing outer tubular portion 123 is shaped generally in a cylindrical tubular form such that the housing outer tubular portion 123 extends from an outer periphery of the housing plate portion 122 toward the same axial side as the housing inner tubular portion 121. Here, the housing inner tubular portion 121, the housing plate portion 122 and the housing outer tubular portion 123 are formed integrally in one-piece from, for example, metal.

As described above, the housing 12 is hollow and flattened as a whole.

The seal groove 124 is shaped in an annular form (i.e., a ring form) such that the seal groove 124 is recessed from an outer peripheral wall of the housing inner tubular portion 121 toward the radially inner side. The housing step surface 125 is formed as a circular annular flat surface and is placed between the seal groove 124 and the housing plate portion 122 and faces toward an axial side that is opposite to the housing plate portion 122.

The housing-side spline grooves 127 are formed at the outer peripheral wall of the housing inner tubular portion 121 such that the housing-side spline grooves 127 extend in the axial direction of the housing inner tubular portion 121. The housing-side spline grooves 127 are arranged one after another in a circumferential direction of the housing inner tubular portion 121. The housing hole 128 extends through the housing plate portion 122 in a plate thickness direction of the housing plate portion 122 (a direction of a thickness of the housing plate portion 122).

The housing 12 is fixed to the fixing body 11 such that a portion of an outer wall of the housing 12 contacts a portion of a wall surface of the fixing body 11 (see FIG. 2). The housing 12 is coaxial with the fixing body 11 and the input shaft 61. Here, "coaxial" is not limited to a coaxial state in which two axes are strictly coincident but may include a state in which the two axes are slightly deviated from each other or are tilted relative to each other (this is also true for the following description).

The housing 12 has a receiving space (serving as a space) 120. The receiving space 120 is formed by the housing inner tubular portion 121, the housing plate portion 122 and the housing outer tubular portion 123.

The electric motor 20 is received in the receiving space 120. The electric motor 20 includes a stator 21, a plurality of coils 22, a rotor 23, a plurality of magnets (serving as magnets) 230 and a magnet cover 24.

The stator 21 includes a stator yoke 211 and a plurality of stator teeth 212. The stator 21 is formed by, for example, a plurality of laminated steel sheets. The stator yoke 211 is shaped generally in a cylindrical tubular form. The stator teeth 212 are formed integrally with the stator yoke 211 such that the stator teeth 212 radially inwardly project from an inner peripheral wall of the stator yoke 211. The stator teeth 212 are arranged at equal intervals in the circumferential direction of the stator yoke 211. The coils 22 are respectively wound to the stator teeth 212. The stator 21 is fixed to the housing 12 such that an outer peripheral wall of the stator yoke 211 is fitted to an inner peripheral wall of the housing outer tubular portion 123.

The rotor 23 is made of, for example, iron-based metal. The rotor 23 includes a rotor main body 231 and a rotor tubular portion 232. The rotor main body 231 is shaped generally in a circular annular form (i.e., a circular ring form). The rotor tubular portion 232 extends in a tubular form from an outer periphery of the rotor main body 231.

The magnets 230 are arranged along an outer peripheral wall of the rotor 23. The magnets 230 are arranged at equal intervals in a circumferential direction of the rotor 23 such that magnetic poles of the magnets 230 are alternately arranged in the circumferential direction to alternately have opposite polarities.

The magnet cover 24 is installed to the rotor 23 such that the magnet cover 24 covers outer surfaces of the magnets 230, which are located on the radially outer side in the radial direction of the rotor 23. More specifically, the magnet cover 24 is made of, for example, a non-magnetic metal material.

The clutch actuator 10 includes a rotor bearing 15. On a side of the housing step surface 125 where the housing plate portion 122 is placed, the rotor bearing 15 is installed on a radially outer side of the housing inner tubular portion 121. The rotor bearing 15 includes an inner race 151, an outer race 152 and a plurality of bearing balls (serving as bearing rolling-elements) 153.

Each of the inner race 151 and the outer race 152 is made of, for example, metal and is shaped in a tubular form. The outer race 152 is located on a radially outer side of the inner race 151. Each of the bearing balls 153 is made of, for example, metal and is shaped in a spherical form. The bearing balls 153 are received in a groove of the inner race 151, which is shaped in an annular form and is formed at an outer peripheral wall of the inner race 151, and a groove of the outer race 152, which is shaped in an annular form and is formed at an inner peripheral wall of the outer race 152, such that the bearing balls 153 are rotatable between the inner race 151 and the outer race 152. The bearing balls 153 are arranged one after another in the circumferential direction of the inner race 151 and the outer race 152. The inner race 151 and the outer race 152 are rotatable relative to each other as the bearing balls 153 are rolled between the inner race 151 and the outer race 152. A relative movement between the inner race 151 and the outer race 152 in the axial direction is limited by the bearing balls 153.

The rotor bearing 15 is installed to the housing inner tubular portion 121 in a state where the inner peripheral wall of the inner race 151 contacts the outer peripheral wall of the housing inner tubular portion 121, and one end surface of the inner race 151, which faces in the axial direction, is spaced from the housing plate portion 122 by a predetermined distance. The rotor 23 is installed such that an inner peripheral wall of the rotor main body 231 is fitted to an outer peripheral wall of the rotor bearing 15. In this way, the rotor bearing 15 supports the rotor 23 such that the rotor 23 is rotatable relative to the housing 12.

The ECU 100 can control the operation of the electric motor 20 by controlling the electric power supplied to the coils 22. When the electric power is supplied to the coils 22, a rotating magnetic field is generated in the stator 21, and thereby the rotor 23 is rotated. Thus, a torque of rotation is outputted from the rotor 23. As described above, the electric motor 20 includes the stator 21 and the rotor 23, and the rotor 23 is configured to be rotated relative to the stator 21. The electric motor 20 is configured to output the torque of rotation through rotation thereof in response to supply of an electric power to the electric motor 20.

The rotor 23 is placed on the radially inner side of the stator 21 and is configured to rotate relative to the stator 21. The electric motor 20 is an inner rotor type brushless DC motor.

In the present embodiment, the clutch actuator 10 includes a plurality of rotational angle sensors 104. The rotational angle sensors 104 are installed to the electric motor 20 such that the rotational angle sensors 104 are placed on the housing plate portion 122 side of the coils 22.

Each of the rotational angle sensors 104 is configured to sense a magnetic flux generated from sensor magnets or the magnets 230 rotated integrally with the rotor 23 and output a signal, which corresponds to the sensed magnetic flux, to the ECU 100. Therefore, the ECU 100 senses the rotational angle and the rotational speed of the rotor 23 based on the signals outputted from the rotational angle sensors 104. Furthermore, based on the rotational angle and the rotational speed of the rotor 23, the ECU 100 can calculate a relative rotational angle of the drive cam 40 relative to the housing 12 and a driven cam 50 described later and a relative axial position of the driven cam 50 relative to the housing 12 and the drive cam 40.

Figure 3:
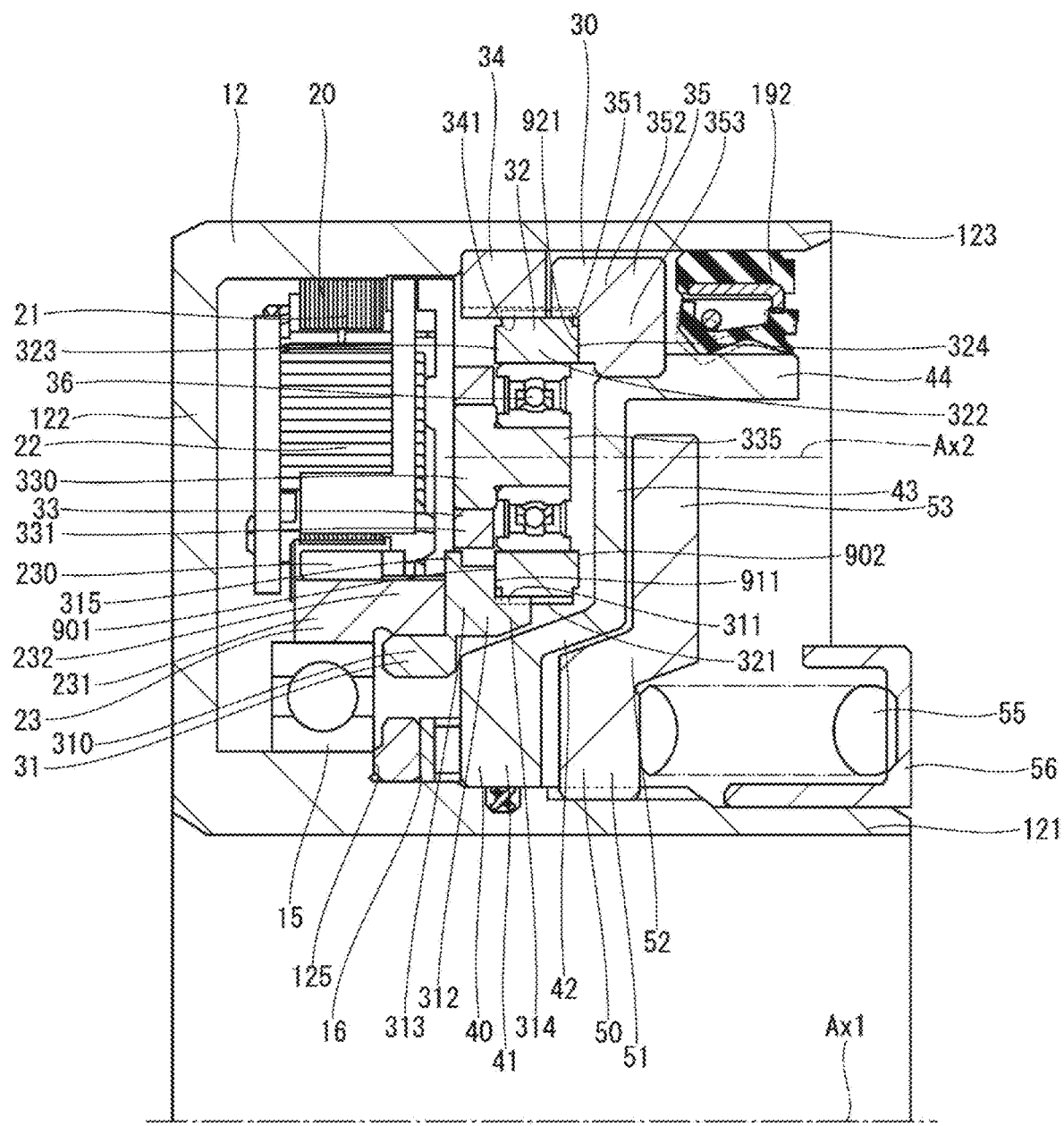
FIG. 3 is a cross-sectional view showing a portion of the clutch actuator according to the first embodiment.

As shown in FIG. 3, the speed reducer 30 includes a sun gear 31, a plurality of planetary gears 32, a carrier 33, a first ring gear 34 and a second ring gear 35.

The sun gear 31 is coaxial with the rotor 23 and is configured to rotate integrally with the rotor 23. That is, the rotor 23 and the sun gear 31 are formed separately from each other from different materials, respectively, and are placed coaxial with each other such that the rotor 23 and the sun gear 31 are integrally rotatable.

More specifically, the sun gear 31 includes a sun gear base 310, a plurality of sun gear teeth (serving as teeth and external teeth) 311, a sun gear tubular portion 312 and a sun gear extension 315. The sun gear 31 is made of, for example, metal. The sun gear base 310 is shaped generally in a circular annular form. The sun gear tubular portion 312 is formed integrally with the sun gear base 310 in one-piece such that the sun gear tubular portion 312 extends from an outer periphery of the sun gear base 310 and is shaped in a tubular form. The sun gear teeth 311 are formed at an outer peripheral wall of an end portion of the sun gear tubular portion 312 which is opposite from the sun gear base 310. The sun gear extension 315 is shaped in an annular form such that the sun gear extension 315 extends radially outward from an outer peripheral wall of another end portion of the sun gear tubular portion 312 located on the sun gear base 310 side.

The sun gear 31 is installed such that an outer peripheral wall of the sun gear base 310 is fitted to an inner peripheral wall of the rotor tubular portion 232. In this way, the sun gear 31 is supported by the rotor bearing 15 along with the rotor 23 such that the sun gear 31 and the rotor 23 are rotatable relative to the housing 12.

The sun gear 31, which is rotated integrally with the rotor 23, receives the torque transmitted from the electric motor 20. Here, the sun gear 31 serves as an input element of the speed reducer 30.

The planetary gears 32 are arranged one after another in the circumferential direction of the sun gear 31. Each of the planetary gears 32 meshes with the sun gear 31 and is configured to rotate and revolve around the sun gear 31 in the circumferential direction of the sun gear 31. More specifically, each of the planetary gears 32 is made of, for example, metal and is shaped generally in a cylindrical tubular form, and the planetary gears 32 are located on the radially outer side of the sun gear 31 and are arranged at equal intervals in the circumferential direction of the sun gear 31. In the present embodiment, the number of the planetary gears 32 is four. Each of the planetary gears 32 includes a plurality of planetary gear teeth (serving as teeth and external teeth) 321. The planetary gear teeth 321 are formed at an outer peripheral wall of the planetary gear 32 and are configured to mesh with the sun gear teeth 311.

The carrier 33 rotatably supports the planetary gears 32 and is configured to rotate relative to the sun gear 31.

More specifically, the carrier 33 includes a carrier main body 331. The carrier main body 331 is made of, for example, metal and is shaped generally in a circular annular plate form. The carrier main body 331 is positioned between the coils 22 and the planetary gears 32 in the axial direction.

The speed reducer 30 includes a plurality of pins 335 and a plurality of planetary gear bearings 36. Each of the pins 335 is made of, for example, metal and is shaped generally in a cylindrical columnar form. An axial end portion of each pin 335 is fixed to the carrier main body 331.

Each of the planetary gear bearings 36 is installed between an outer peripheral wall of a corresponding one of the pins 335 and an inner peripheral wall of a corresponding one of the planetary gears 32. Therefore, each of the planetary gears 32 is rotatably supported by the corresponding pin 335 through the corresponding planetary gear bearing 36. That is, each of the pins 335 is installed at the rotational center of the corresponding planetary gear 32 and rotatably supports the corresponding planetary gear 32. Furthermore, each planetary gear 32 and the corresponding pin 335 can make a relative movement therebetween in the axial direction within a predetermined range through the corresponding planetary gear bearing 36. In other words, the movable range for making the relative movement between the planetary gear 32 and the pin 335 in the axial direction is limited within the predetermined range by the planetary gear bearing 36.

The first ring gear 34 includes a plurality of first ring gear teeth 341 which can mesh with the planetary gears 32, and the first ring gear 34 is fixed to the housing 12. More specifically, the first ring gear 34 is made of, for example, metal and is shaped generally in a cylindrical tubular form. On an opposite side of the stator 21, which is opposite to the housing plate portion 122, the first ring gear 34 is fixed to the housing 12 such that an outer periphery of the first ring gear 34 is fitted to the inner peripheral wall of the housing outer tubular portion 123. Therefore, the first ring gear 34 is not rotatable relative to the housing 12.

Here, the first ring gear 34 is coaxial with the housing 12, the rotor 23 and the sun gear 31. The first ring gear teeth (serving as teeth and internal teeth) 341 are formed at an inner peripheral wall of the first ring gear 34 such that the first ring gear teeth 341 can mesh with one axial end portions of the planetary gear teeth 321 of each of the planetary gears 32.

The second ring gear 35 includes a plurality of second ring gear teeth 351 which are configured to mesh with the planetary gears 32. The number of the second ring gear teeth 351 of the second ring gear 35 (a total tooth number of the second ring gear 35) is different from the number of the first ring gear teeth 341 of the first ring gear 34 (a total tooth number of the first ring gear 34). Furthermore, the second ring gear 35 is configured to rotate integrally with the drive cam 40 described later. More specifically, the second ring gear 35 is made of, for example, metal and is shaped in a tubular form.

Here, the second ring gear 35 is coaxial with the housing 12, the rotor 23 and the sun gear 31. The second ring gear teeth (serving as teeth and internal teeth) 351 are formed at an inner peripheral wall of an axial end portion of the second ring gear 35, which is adjacent to the first ring gear 34, such that the second ring gear teeth 351 can mesh with the other axial end portions of the planetary gear teeth 321 of each of the planetary gears 32. In the present embodiment, the number of the second ring gear teeth 351 is larger than the number of the first ring gear teeth 341. More specifically, the number of the second ring gear teeth 351 is larger than the number of the first ring gear teeth 341 by the number that is obtained by multiplying the number of the planetary gears 32 by an integer.

Furthermore, each of the planetary gears 32 must normally mesh with the first ring gear 34 and the second ring gear 35, which have two different specifications, respectively, at the same location without generating interference. Therefore, each of the planetary gears 32 is designed such that a center distance (center-to-center distance) of each gear pair is kept constant by displacing one or both of the first ring gear 34 and the second ring gear 35.

With the above configuration, when the rotor 23 of the electric motor 20 is rotated, the sun gear 31 is rotated. Therefore, in the state where the planetary gear teeth 321 of each planetary gear 32 mesh with the sun gear teeth 311, the first ring gear teeth 341 and the second ring gear teeth 351, each planetary gear 32 is rotated and is revolved around the sun gear 31 in the circumferential direction of the sun gear 31. Here, since the number of the second ring gear teeth 351 is larger than the number of the first ring gear teeth 341, the second ring gear 35 is rotated relative to the first ring gear 34. Therefore, among the first ring gear 34 and the second ring gear 35, small differential rotation, which corresponds to a difference between the number of the first ring gear teeth 341 and the number of the second ring gear teeth 351, is outputted as the rotation of the second ring gear 35. Thus, the torque of the rotation, which is transmitted from the electric motor 20, is outputted from the second ring gear 35 after the rotational speed of the rotation is reduced by the speed reducer 30. As described above, the speed reducer 30 is configured to output the torque of the rotation, which is transmitted from the electric motor 20, after reducing the rotational speed of the rotation. In the present embodiment, the speed reducer 30 is a speed reducer having a 3K-type mechanical paradox planetary gear drive.

The second ring gear 35 is formed separately from the drive cam 40 described later and is configured to rotate integrally with the drive cam 40. The second ring gear 35 outputs the torque of the rotation, which is transmitted from the electric motor 20, to the drive cam 40 after reducing the rotational speed of the rotation. Here, the second ring gear 35 serves as an output element of the speed reducer 30.

The torque cam 2 includes: the drive cam (serving as a rotary element) 40; the driven cam (serving as a translating element) 50; and a plurality of cam balls (serving as cam rolling-elements) 3.

The drive cam 40 includes a drive cam main body 41, a drive cam specific shape portion 42, a drive cam plate portion 43, a drive cam outer tubular portion 44 and a plurality of drive cam grooves 400. The drive cam main body 41 is shaped generally in a circular annular plate form. The drive cam specific shape portion 42 extends from an outer periphery of the drive cam main body 41 and is tilted relative to an axis of the drive cam main body 41. The drive cam plate portion 43 is shaped generally in a circular annular plate form and radially outwardly extends from an end portion of the drive cam specific shape portion 42 which is opposite to the drive cam main body 41. The drive cam outer tubular portion 44 is shaped generally in a cylindrical tubular form and extends from an outer periphery of the drive cam plate portion 43 toward a side that is opposite to the drive cam specific shape portion 42. Here, the drive cam main body 41, the drive cam specific shape portion 42, the drive cam plate portion 43 and the drive cam outer tubular portion 44 are formed integrally in one-piece from, for example, metal.

The drive cam grooves 400 are recessed from one end surface of the drive cam main body 41 toward another end surface of the drive cam main body 41 and extend in the circumferential direction of the drive cam main body 41. Each of the drive cam grooves 400 changes its depth, which is measured from the one end surface of the drive cam main body 41, in the circumferential direction of the drive cam main body 41. The number of the drive cam grooves 400 is, for example, three, and these three drive cam grooves 400 are arranged at equal intervals in the circumferential direction of the drive cam main body 41.

The drive cam 40 is installed between the housing inner tubular portion 121 and the housing outer tubular portion 123 such that the drive cam main body 41 is placed between the outer peripheral wall of the housing inner tubular portion 121 and the inner peripheral wall of the sun gear tubular portion 312 of the sun gear 31, and the drive cam plate portion 43 is placed on an opposite side of the planetary gears 32 which is opposite to the carrier main body 331. The drive cam 40 is configured to rotate relative to the housing 12.

The second ring gear 35 is formed integrally with the drive cam 40 such that an inner peripheral wall of an end portion of the second ring gear 35, which is opposite to the end portion of the second ring gear 35 that has the second ring gear teeth 351, is fitted to an outer periphery of the drive cam plate portion 43. The second ring gear 35 is not rotatable relative to the drive cam 40. That is, the second ring gear 35 is configured to rotate integrally with the drive cam (serving as the rotary element) 40. Therefore, when the second ring gear 35 outputs the torque of the rotation, which is transmitted from the electric motor 20 after reducing the rotational speed of the rotation through the speed reducer 30, the drive cam 40 is rotated relative to the housing 12. Specifically, the drive cam 40 is rotated relative to the housing 12 when the torque, which is outputted from the speed reducer 30, is inputted to the drive cam 40.

The driven cam 50 includes a driven cam main body 51, a driven cam specific shape portion 52, a driven cam plate portion 53, a plurality of cam-side spline grooves 54 and a plurality of driven cam grooves 500. The driven cam main body 51 is shaped generally in a circular annular plate form. The driven cam specific shape portion 52 extends from an outer periphery of the driven cam main body 51 and is tilted relative to an axis of the driven cam main body 51. The driven cam plate portion 53 is shaped generally in a circular annular plate form and radially outwardly extends from an end portion of the driven cam specific shape portion 52 which is opposite to the driven cam main body 51. Here, the driven cam main body 51, the driven cam specific shape portion 52 and the driven cam plate portion 53 are formed integrally in one-piece from, for example, metal.

The cam-side spline grooves 54 are formed at an inner peripheral wall of the driven cam main body 51 and extend in the axial direction. The cam-side spline grooves 54 are arranged one after another in the circumferential direction of the driven cam main body 51.

The driven cam 50 is arranged such that the driven cam main body 51 is placed on a side of the drive cam main body 41, which is opposite to the rotor bearing 15, while the driven cam main body 51 is placed on a radially inner side of the drive cam specific shape portion 42 and the drive cam plate portion 43, and the cam-side spline grooves 54 are spline-coupled with the housing-side spline grooves 127. Therefore, the driven cam 50 is not rotatable relative to the housing 12 and is movable relative to the housing 12 in the axial direction.

The driven cam grooves 500 are recessed from one end surface (the drive cam main body 41 side surface) of the driven cam main body 51 toward another end surface of the driven cam main body 51 and extend in the circumferential direction of the driven cam main body 51. Each of the driven cam grooves 500 changes its depth, which is measured from the one end surface of the driven cam main body 51, in the circumferential direction of the driven cam main body 51. The number of the driven cam grooves 500 is, for example, three, and these three driven cam grooves 500 are arranged at equal intervals in the circumferential direction of the driven cam main body 51.

The drive cam grooves 400 and the driven cam grooves 500 respectively have an identical shape when viewed from a surface of the drive cam main body 41, which is placed on the driven cam main body 51 side, or viewed from a surface of the driven cam main body 51, which is placed on the drive cam main body 41 side.

Each of the cam balls 3 is made of, for example, metal and is shaped in a spherical form. Each of the cam balls 3 is rotatably placed between a corresponding one of the three drive cam grooves 400 and a corresponding one of the three driven cam grooves 500. That is, the number of the cam balls 3 is three.

As described above, the drive cam 40, the driven cam 50 and the cam balls 3 form the torque cam (serving as the rolling-element cam) 2. When the drive cam 40 is rotated relative to the housing 12 and the driven cam 50, each of the cam balls 3 is rolled along a groove bottom of the corresponding drive cam groove 400 and a groove bottom of the corresponding driven cam groove 500.

As described above, the depth of each of the drive cam grooves 400 and the driven cam grooves 500 changes in the circumferential direction of the drive cam 40 or the driven cam 50. Therefore, when the drive cam 40 is rotated relative to the housing 12 and the driven cam 50 by the torque, which is outputted from the speed reducer 30, each of the cam balls 3 is rolled along the corresponding drive cam groove 400 and the corresponding driven cam groove 500, and thereby the driven cam 50 is moved, i.e., is reciprocated in the axial direction relative to the drive cam 40 and the housing 12.

As described above, the driven cam 50 has the driven cam grooves 500, each of which is formed at the one end surface of the driven cam 50 and clamps the corresponding cam ball 3 in cooperation with the corresponding drive cam groove 400, and the driven cam 50 cooperates with the drive cam 40 and the cam balls 3 to form the torque cam 2. When the drive cam 40 is rotated relative to the housing 12, the driven cam 50 is moved in the axial direction relative to the drive cam 40 and the housing 12. Here, since the cam-side spline grooves 54 are spline-coupled with the housing-side spline grooves 127, the driven cam 50 is not rotated relative to the housing 12. Furthermore, although the drive cam 40 is rotated relative to the housing 12, the drive cam 40 is not moved in the axial direction relative to the housing 12.

The torque cam 2 is placed on the one side of the electric motor 20 in the axial direction and converts the rotating motion, which is generated by the torque transmitted from the electric motor 20, into the translating motion that is the movement in the axial direction relative to the housing 12.

In the present embodiment, the clutch actuator 10 includes a return spring (serving as an urging member) 55 and a return spring retainer 56. The return spring 55 is, for example, a coil spring. On a side of the driven cam main body 51, which is opposite to the drive cam main body 41, the return spring 55 is placed on the radially outer side of the housing inner tubular portion 121. One end portion of the return spring 55 contacts a surface of the driven cam main body 51 which is opposite to the drive cam main body 41.

The return spring retainer 56 includes a retainer inner tubular portion 561, a retainer plate portion 562 and a retainer outer tubular portion 563. The retainer inner tubular portion 561 is shaped generally in a cylindrical tubular form. The retainer plate portion 562 is shaped in an annular plate form such that the retainer plate portion 562 radially outwardly extends from one end portion of the retainer inner tubular portion 561. The retainer outer tubular portion 563 is shaped generally in a cylindrical tubular form such that the retainer outer tubular portion 563 extends from an outer periphery of the retainer plate portion 562 toward the same axial side as the retainer inner tubular portion 561. The retainer inner tubular portion 561, the retainer plate portion 562 and the retainer outer tubular portion 563 are formed integrally in one-piece from, for example, metal.

The return spring retainer 56 is fixed to the housing inner tubular portion 121 such that an inner peripheral wall of the retainer inner tubular portion 561 is fitted to an outer peripheral wall of the housing inner tubular portion 121. The other end portion of the return spring 55 contacts the retainer plate portion 562 at a location between the retainer inner tubular portion 561 and the retainer outer tubular portion 563.

The return spring 55 has an axially expanding force. Therefore, the driven cam 50 is urged by the return spring 55 toward the drive cam main body 41 in the state where the cam balls 3 are clamped between the driven cam 50 and the drive cam 40.

The output shaft 62 includes a shaft portion 621, a plate portion 622, a tubular portion 623 and a friction plate 624 (see FIG. 2). The shaft portion 621 is shaped generally in a cylindrical tubular form. The plate portion 622 is formed integrally with the shaft portion 621 in one-piece such that the plate portion 622 is shaped in an annular plate form and radially outwardly extends from one end of the shaft portion 621. The tubular portion 623 is formed integrally with the plate portion 622 in one-piece such that the tubular portion 623 is shaped generally in a cylindrical tubular form and extends from an outer periphery of the plate portion 622 toward a side that is opposite to the shaft portion 621. The friction plate 624 is shaped generally in a circular annular plate form and is installed at an end surface of the plate portion 622 which faces the tubular portion 623. Here, the friction plate 624 is not rotatable relative to the plate portion 622. A clutch space 620 is formed at an inside of the tubular portion 623.

An end portion of the input shaft 61 extends through an inside of the housing inner tubular portion 121 and is placed on a side of the driven cam 50 which is opposite to the drive cam 40. The output shaft 62 is coaxial with the input shaft 61 and is placed on a side of the driven cam 50 which is opposite to the drive cam 40. A ball bearing 142 is installed between an inner peripheral wall of the shaft portion 621 and an outer peripheral wall of the end portion of the input shaft 61. Therefore, the output shaft 62 is rotatably supported by the input shaft 61 through the ball bearing 142. The input shaft 61 and the output shaft 62 are rotatable relative to the housing 12.

The clutch 70 is placed in the clutch space 620 at a location between the input shaft 61 and the output shaft 62. The clutch 70 includes a plurality of inner friction plates 71, a plurality of outer friction plates 72 and an anchoring portion 701. The inner friction plates 71 are respectively shaped generally in a circular annular plate form and are arranged one after another in the axial direction at a location between the input shaft 61 and the tubular portion 623 of the output shaft 62. An inner periphery of each of the inner friction plates 71 is spline-coupled to the outer peripheral wall of the input shaft 61. Therefore, each inner friction plate 71 is not rotatable relative to the input shaft 61 and is movable relative to the input shaft 61 in the axial direction.

The outer friction plates 72 are respectively shaped generally in a circular annular plate form and are arranged one after another in the axial direction at the location between the input shaft 61 and the tubular portion 623 of the output shaft 62. The inner friction plates 71 and the outer friction plates 72 are alternately arranged in the axial direction of the input shaft 61. An outer periphery of each of the outer friction plates 72 is spline-coupled to the inner peripheral wall of the tubular portion 623 of the output shaft 62. Therefore, each outer friction plate 72 is not rotatable relative to the output shaft 62 and is movable relative to the output shaft 62 in the axial direction. The closest one of the outer friction plates 72, which is the closest to the friction plate 624, can contact the friction plate 624.

The anchoring portion 701 is shaped generally in a circular annular form and is installed such that an outer periphery of the anchoring portion 701 is fitted into the inner peripheral wall of the tubular portion 623 of the output shaft 62. The outer periphery of the closest one of the outer friction plates 72, which is the closest to the driven cam 50, can be anchored to the anchoring portion 701. Therefore, removal of the outer friction plates 72 and the inner friction plates 71 from the inside of the tubular portion 623 is limited. A distance between the anchoring portion 701 and the friction plate 624 is larger than a sum of plate thicknesses of the outer friction plates 72 and the inner friction plates 71.

In a coupled state where the inner friction plates 71 and the outer friction plates 72 are in contact with each other, i.e., are coupled with each other, a frictional force is generated between the inner friction plates 71 and the outer friction plates 72. Relative rotation between the inner friction plates 71 and the outer friction plates 72 is limited according to the amount of this frictional force. In contrast, in a decoupled state where the inner friction plates 71 and the outer friction plates 72 are spaced from each other, i.e., are decoupled from each other, the frictional force is not generated between the inner friction plates 71 and the outer friction plates 72. Therefore, the relative rotation between the inner friction plates 71 and the outer friction plates 72 is not limited.

In the coupled state of the clutch 70, the torque, which is inputted to the input shaft 61, is transmitted to the output shaft 62 through the clutch 70. In contrast, in the decoupled state of the clutch 70, the torque, which is inputted to the input shaft 61, is not transmitted to the output shaft 62.

As described above, the clutch 70 is configured to transmit the torque between the input shaft 61 and the output shaft 62. In the coupled state, the clutch 70 enables the transmission of the torque between the input shaft 61 and the output shaft 62. In contrast, in the decoupled state, the clutch 70 blocks the transmission of the torque between the input shaft 61 and the output shaft 62.

In the present embodiment, the clutch device 1 is a normally open type clutch device that is normally in the decoupled state.

The clutch actuator 10 includes a state shifter 80. The state shifter 80 includes a coned disc spring (serving as a resiliently deformable portion) 81, a disc spring retainer 82 and a disc spring thrust bearing 83. The disc spring retainer 82 includes a retainer tubular portion 821 and a retainer flange 822. The retainer tubular portion 821 is shaped generally in a cylindrical tubular form. The retainer flange 822 is shaped in an annular plate form such that the retainer flange 822 radially outwardly extends from an end portion of the retainer tubular portion 821. The retainer tubular portion 821 and the retainer flange 822 are formed integrally in one-piece from, for example, metal. The disc spring retainer 82 is installed to the driven cam 50 such that, for example, the other end of the retainer tubular portion 821 contacts the end surface of the driven cam plate portion 53, which is opposite to the drive cam 40. Here, the retainer tubular portion 821 and the driven cam plate portion 53 are joined together by, for example, welding.

An inner periphery of the coned disc spring 81 is placed on the radially outer side of the retainer tubular portion 821 at a location between the driven cam plate portion 53 and the retainer flange 822. The disc spring thrust bearing 83 is shaped in an annular form and is placed on the radially outer side of the retainer tubular portion 821 at a location between the driven cam plate portion 53 and the inner periphery of the coned disc spring 81.

The disc spring retainer 82 is fixed to the driven cam 50 such that the retainer flange 822 can engage with one axial end portion of the coned disc spring 81, i.e., the inner periphery of the coned disc spring 81. Therefore, removal of the coned disc spring 81 and the disc spring thrust bearing 83 from the disc spring retainer 82 is limited by the retainer flange 822. The coned disc spring 81 is resiliently deformable in the axial direction.

FIG. 3 is a cross-sectional view showing the clutch actuator 10 in a state where the state shifter 80 is not installed.

As shown in FIGS. 1 and 2, in a state where each cam ball 3 is placed at: a position (initial point), which serves as a deepest part of the corresponding drive cam groove 400 and is farthest away from the one end surface of the drive cam main body 41 in the axial direction of the drive cam main body 41 (i.e., the depth direction of the corresponding drive cam groove 400); and a position (initial point), which serves as a deepest part of the corresponding driven cam groove 500 and is farthest away from the one end surface of the driven cam main body 51 in the axial direction of the driven cam main body 51 (i.e., the depth direction of the corresponding driven cam groove 500), a distance between the drive cam 40 and the driven cam 50 is relatively short, and a gap Sp1 is formed between the other axial end portion of the coned disc spring 81, i.e., the outer periphery of the coned disc spring 81 and the clutch 70 (see FIG. 1). Therefore, the clutch 70 is in the decoupled state, and thereby the transmission of the torque between the input shaft 61 and the output shaft 62 is blocked.

At the normal operation time, during which the state of the clutch 70 is changed, when the electric power is supplied to the coils 22 of the electric motor 20 through the control of the ECU 100, the electric motor 20 is rotated, and the torque is outputted from the speed reducer 30. Therefore, the drive cam 40 is rotated relative to the housing 12. Thus, each cam ball 3 is rolled from the position, which serves as the deepest part, toward the one side in the circumferential direction of the drive cam groove 400 and the driven cam groove 500. In this way, the driven cam 50 is moved in the axial direction relative to the housing 12, i.e., is moved toward the clutch 70 while compressing the return spring 55. Thereby, the coned disc spring 81 is moved toward the clutch 70.

When the coned disc spring 81 is moved toward the clutch 70 in response to the movement of the driven cam 50 in the axial direction, the gap Sp1 is reduced, and the other axial end portion of the coned disc spring 81 contacts the outer friction plate 72 of the clutch 70. When the driven cam 50 is moved further in the axial direction after the contact of the coned disc spring 81 to the clutch 70, the coned disc spring 81 is resiliently deformed in the axial direction and urges the outer friction plate 72 toward the friction plate 624. Therefore, the inner friction plates 71 and the outer friction plates 72 are coupled to each other, and thereby the clutch 70 is placed in the coupled state. As a result, the transmission of the torque between the input shaft 61 and the output shaft 62 is enabled.

At this time, the coned disc spring 81 is rotatably supported by the disc spring thrust bearing 83 and is rotated relative to the driven cam 50 and the disc spring retainer 82. As described above, the disc spring thrust bearing 83 receives the load from the coned disc spring 81 in the thrust direction and rotatably supports the coned disc spring 81.

When the clutch transmission torque reaches a required clutch torque capacity, the ECU 100 stops the rotation of the electric motor 20. Therefore, the clutch 70 is held in a coupling holding state (state of holding the coupling), in which the clutch transmission torque is maintained at the required clutch torque capacity. As described above, the coned disc spring 81 of the state shifter 80 can receive the force from the driven cam 50 in the axial direction and shift the state of the clutch 70 to the coupled state or the decoupled state according to the relative axial position of the driven cam 50 relative to the housing 12 and the drive cam 40.

Furthermore, the torque cam 2 can convert the rotating motion, which is generated by the torque transmitted from the electric motor 20, into the translating motion, which is the relative movement relative to the housing 12 in the axial direction, to shift the state of the clutch 70 to the coupled state or the decoupled state.

At the output shaft 62, an end portion of the shaft portion 621, which is opposite to the plate portion 622, is coupled to the input shaft of the transmission (not shown) so that the output shaft 62 can rotate integrally with the input shaft of the transmission. That is, the torque, which is outputted from the output shaft 62, is inputted to the input shaft of the transmission. The torque of the rotation, which is inputted to the transmission, is outputted to the drive wheels of the vehicle as a drive torque after the rotational speed of the rotation is changed at the transmission. Thereby, the vehicle is driven.

In the present embodiment, the clutch device 1 includes an oil supply portion 5 (see FIGS. 1 and 2). The oil supply portion 5 is formed in a form of a passage at the output shaft 62 such that one end of the oil supply portion 5 is exposed to the clutch space 620. The other end of the oil supply portion 5 is connected to an oil supply source (not shown). Therefore, oil is supplied from the one end of the oil supply portion 5 to the clutch 70 at the clutch space 620.

The ECU 100 control the amount of the oil supplied from the oil supply portion 5 to the clutch 70. The oil, which is supplied to the clutch 70, can lubricate and cool the clutch 70. Thus, in the present embodiment, the clutch 70 is a wet clutch and can be cooled by the oil.

In the present embodiment, the torque cam (serving as the rotation-to-translation converter) 2 forms the receiving space 120 between: the drive cam (serving as the rotary element) 40 and the second ring gear 35; and the housing 12. Here, the receiving space 120 is formed at the inside of the housing 12 at the location that is on the opposite side of the drive cam 40 and the second ring gear 35 which is opposite to the clutch 70. The electric motor 20 and the speed reducer 30 are installed in the receiving space 120. The clutch 70 is installed in the clutch space 620 that is a space located on the opposite side of the drive cam 40 which is opposite to the receiving space 120.

The clutch actuator 10 includes a thrust bearing 16. As shown in FIG. 1, the thrust bearing 16 includes a plurality of rollers (serving as thrust bearing rolling-elements) 161, a race 162 and a backup plate 163. The race 162 is made of, for example, metal and is shaped in an annular plate form. Each of the rollers 161 is made of, for example, metal and is shaped generally in a cylindrical columnar form. The rollers 161 are arranged to rotate in the circumferential direction of the race 162 while the rollers 161 are in contact with one end surface of the race 162. The rollers 161 are arranged one after another in the circumferential direction of the race 162.

The backup plate 163 includes a plate main body 164 and a plate projection 165. The plate main body 164 is shaped generally in a circular annular form. The plate projection 165 is shaped generally in a circular annular form such that the plate projection 165 projects from an inner periphery of the plate main body 164 in the axial direction. The plate main body 164 and the plate projection 165 are formed integrally in one-piece from, for example, metal.

The backup plate 163 is placed on the radially outer side of the housing inner tubular portion 121 such that the plate projection 165 contacts the housing step surface 125. The race 162 is placed on the radially outer side of the housing inner tubular portion 121 such that the other end surface of the race 162 contacts an end surface of the plate main body 164 which is opposite to the plate projection 165. The rollers 161 are arranged between the race 162 and the drive cam main body 41 and are rotatable in the circumferential direction of the race 162 while the rollers 161 are in contact with the end surface of the race 162, which is located on the drive cam main body 41 side, and a surface of the drive cam main body 41, which is located on the race 162 side.

The thrust bearing 16 rotatably supports the drive cam 40 while receiving a load, which is applied from the drive cam 40 in the thrust direction, i.e., the axial direction. In the present embodiment, the load, which is applied from the clutch 70 side in the axial direction, is applied to the thrust bearing 16 through the coned disc spring 81, the disc spring thrust bearing 83, the driven cam 50, the cam balls 3 and the drive cam 40.

In the present embodiment, the clutch actuator 10 includes an inner seal member (serving as a seal member) 191 and an outer seal member (serving as a seal member) 192. The inner seal member 191 is an oil seal which is shaped in an annular form. The inner seal member 191 is made of an elastic material (e.g., rubber). The outer seal member 192 is an oil seal which is shaped in an annular form. The outer seal member 192 is made of an elastic material (e.g., rubber) and a metal ring.

The inner seal member 191 is installed in the seal groove 124 formed at the housing inner tubular portion 121. The inner seal member 191 is installed in the seal groove 124 such that an outer periphery of the inner seal member 191 is slidable relative to an inner peripheral wall of the drive cam main body 41.

The outer seal member 192 is placed between the housing outer tubular portion 123 and the drive cam outer tubular portion 44 at a location that is on an opposite side of the second ring gear 35 which is opposite to the first ring gear 34. The outer seal member 192 is installed to the housing outer tubular portion 123 such that a seal lip of an inner periphery of the outer seal member 192 is slidable relative to an outer peripheral wall of the drive cam outer tubular portion 44.

Here, when the outer seal member 192 is viewed in the axial direction of the inner seal member 191, the outer seal member 192 is placed on the radially outer side of the inner seal member 191 (see FIGS. 1 and 2).

As described above, the inner peripheral wall of the drive cam main body 41 is slidable relative to the inner seal member 191. That is, the inner seal member 191 is configured to contact the drive cam (serving as the rotary element) 40. The inner seal member 191 provides the gas-tight or liquid-tight seal between the drive cam main body 41 and the housing inner tubular portion 121.

The outer peripheral wall of the drive cam outer tubular portion 44 is slidable relative to the seal lip that is the inner periphery of the outer seal member 192. Specifically, the outer seal member 192 is configured to contact the drive cam (serving as the rotary element) 40. The outer seal member 192 provides the gas-tight or liquid-tight seal between the outer peripheral wall of the drive cam outer tubular portion 44 and the inner peripheral wall of the housing outer tubular portion 123.

The inner seal member 191 and the outer seal member 192 can maintain the gas-tight or liquid-tight sealing of the receiving space 120, which receives the electric motor 20 and the speed reducer 30. Also, the inner seal member 191 and the outer seal member 192 can maintain the gas-tight or liquid-tight sealing between: the receiving space 120; and the clutch space 620 which receives the clutch 70. Therefore, even when the foreign objects, such as wear particles, are generated at, for example, the clutch 70, it is possible to limit the intrusion of the foreign objects from the clutch space 620 into the receiving space 120. Therefore, it is possible to limit malfunctions of the electric motor 20 or the speed reducer 30 caused by the foreign objects.

Hereinafter, the structure of the respective portions of the present embodiment will be described in detail.

With reference to FIG. 3, the planetary gears 32, the pins 335, the planetary gear bearings 36 and the carrier 33 form a carrier subassembly 330.

At least one planetary gear 32 among the plurality of planetary gears 32 has: a first planetary gear annular surface 901 which is an annular surface formed at one axial end of the at least one planetary gear 32; and a second planetary gear annular surface 902 which is an annular surface formed at another axial end of the at least one planetary gear 32 that is opposite to the one axial end of the at least one planetary gear 32.

Specifically, the planetary gear 32 includes the planetary gear teeth 321, a planetary gear main body 322, a first projection 323 and a second projection 324. The planetary gear main body 322 is shaped in a tubular form. The first projection 323 is shaped in a tubular form and projects from the one axial end surface of the planetary gear 32. An outer diameter of the first projection 323 is smaller than an outer diameter of the planetary gear main body 322. An end surface of the first projection 323, which is opposite to the planetary gear main body 322, is shaped in an annular flat surface. The second projection 324 is shaped in a tubular form and projects from the other axial end surface of the planetary gear 32. An outer diameter of the second projection 324 is smaller than the outer diameter of the planetary gear main body 322. An end surface of the second projection 324, which is opposite to the planetary gear main body 322, is shaped in an annular flat surface. The planetary gear teeth 321 are formed at an outer peripheral wall of the planetary gear main body 322.

The first planetary gear annular surface 901 and the second planetary gear annular surface 902 are respectively formed at the end surface of the first projection 323 and the end surface of the second projection 324. Therefore, each of the first planetary gear annular surface 901 and the second planetary gear annular surface 902 is formed as the annular flat surface. Each of the four planetary gears 32 includes the first planetary gear annular surface 901 and the second planetary gear annular surface 902.

The sun gear 31 has a sun gear annular surface 911 that is an annular surface and is opposed to the first planetary gear annular surface 901 such that a portion of the sun gear annular surface 911 is abuttable against and is slidable relative to a portion of the first planetary gear annular surface 901.

More specifically, the sun gear tubular portion 312 includes a sun gear large diameter portion 313 and a sun gear small diameter portion 314. The sun gear large diameter portion 313 is placed adjacent to the sun gear base 310 and is shaped in a tubular form. The sun gear small diameter portion 314 is located on a side of the sun gear large diameter portion 313 which is opposite to the sun gear base 310, and the sun gear small diameter portion 314 is formed integrally with the sun gear large diameter portion 313 in a tubular form in one-piece. An outer diameter of the sun gear small diameter portion 314 is smaller than an outer diameter of the sun gear large diameter portion 313. Therefore, a step surface, which is an annular flat surface, is formed between an outer peripheral wall of the sun gear large diameter portion 313 and an outer peripheral wall of the sun gear small diameter portion 314. The sun gear annular surface 911 is formed at this step surface. Therefore, the sun gear annular surface 911 is formed as an annular flat surface.

The sun gear teeth 311 are formed at the outer peripheral wall of the sun gear small diameter portion 314. The portion of the sun gear annular surface 911 is opposed to the portion of the first planetary gear annular surface 901 such that the portion of the sun gear annular surface 911 is abuttable against and is slidable relative to the portion of the first planetary gear annular surface 901. Therefore, when viewed in an axial direction of the axis Ax1 of the sun gear 31 and in an axial direction of the axis Ax2 of the planetary gear 32, the portion of the sun gear annular surface 911 and the portion of the first planetary gear annular surface 901 overlaps with each other (see an area shaded with a mesh in FIG. 4).

The second ring gear 35 has an output-side annular surface 921 which is an annular surface, and a portion of the output-side annular surface 921 is opposed to a portion of the second planetary gear annular surface 902 such that the portion of the output-side annular surface 921 is abuttable against and is slidable relative to the portion of the second planetary gear annular surface 902.

More specifically, the second ring gear 35 includes the second ring gear teeth 351, a second ring gear main body 352 and a second ring gear extension 353. The second ring gear main body 352 is shaped in a tubular form. The second ring gear extension 353 is shaped in an annular form such that the second ring gear extension 353 radially inwardly extends from an inner peripheral wall of an opposite portion of the second ring gear main body 352, which is opposite to the first ring gear 34. An end surface of the second ring gear extension 353, which is located on the first ring gear 34 side, is formed as an annular flat surface. The output-side annular surface 921 is formed at the end surface of the second ring gear extension 353 which is located on the first ring gear 34 side. Therefore, the output-side annular surface 921 is formed as the annular flat surface.

The second ring gear teeth 351 are formed at an inner peripheral wall of a portion of the second ring gear main body 352 which is on the first ring gear 34 side of the second ring gear extension 353. A portion of the output-side annular surface 921 is opposed to a portion of the second planetary gear annular surface 902 such that the portion of the output-side annular surface 921 is abuttable against and is slidable relative to the portion of the second planetary gear annular surface 902. Therefore, when viewed in the axial direction of the planetary gear 32, the portion of the output-side annular surface 921 and the portion of the second planetary gear annular surface 902 overlap with each other.

A relative movement of the carrier subassembly 330 relative to the housing 12 in the axial direction is limited when the first planetary gear annular surface 901 abuts against the sun gear annular surface 911 or when the second planetary gear annular surface 902 abuts against the output-side annular surface 921.

Therefore, the position of the carrier subassembly 330 in the axial direction can be limited by the sun gear annular surface 911 of the sun gear 31 and the output-side annular surface 921 of the second ring gear 35.

An outer diameter of each of the first planetary gear annular surface 901 and the second planetary gear annular surface 902 is set to be equal to or smaller than a diameter of a dedendum circle of the planetary gear 32. An outer diameter of the sun gear annular surface 911 is set to be equal to or larger than a diameter of an addendum circle of the sun gear 31. An inner diameter of the output-side annular surface 921 is set to be equal to or smaller than a diameter of an addendum circle of the second ring gear 35.

More specifically, the outer diameter of each of the first planetary gear annular surface 901 and the second planetary gear annular surface 902 is set to be smaller than the diameter of the dedendum circle of the planetary gear teeth 321. The outer diameter of the sun gear annular surface 911 is set to be larger than the diameter of the addendum circle of the sun gear teeth 311. The inner diameter of the output-side annular surface 921 is set to be smaller than the diameter of the addendum circle of the second ring gear teeth 351.

The outer diameter of the sun gear annular surface 911 and the inner diameter of the output-side annular surface 921 are sized to maintain the opposing state between the first planetary gear annular surface 901 and the sun gear annular surface 911 and the opposing state between the second planetary gear annular surface 902 and the output-side annular surface 921 even when an error occurs in a center-to-center distance between any two of a center of the sun gear 31, a center of the planetary gear (the at least one planetary gear) 32, a center of the first ring gear 34 and a center of the second ring gear 35.

Figure 4:
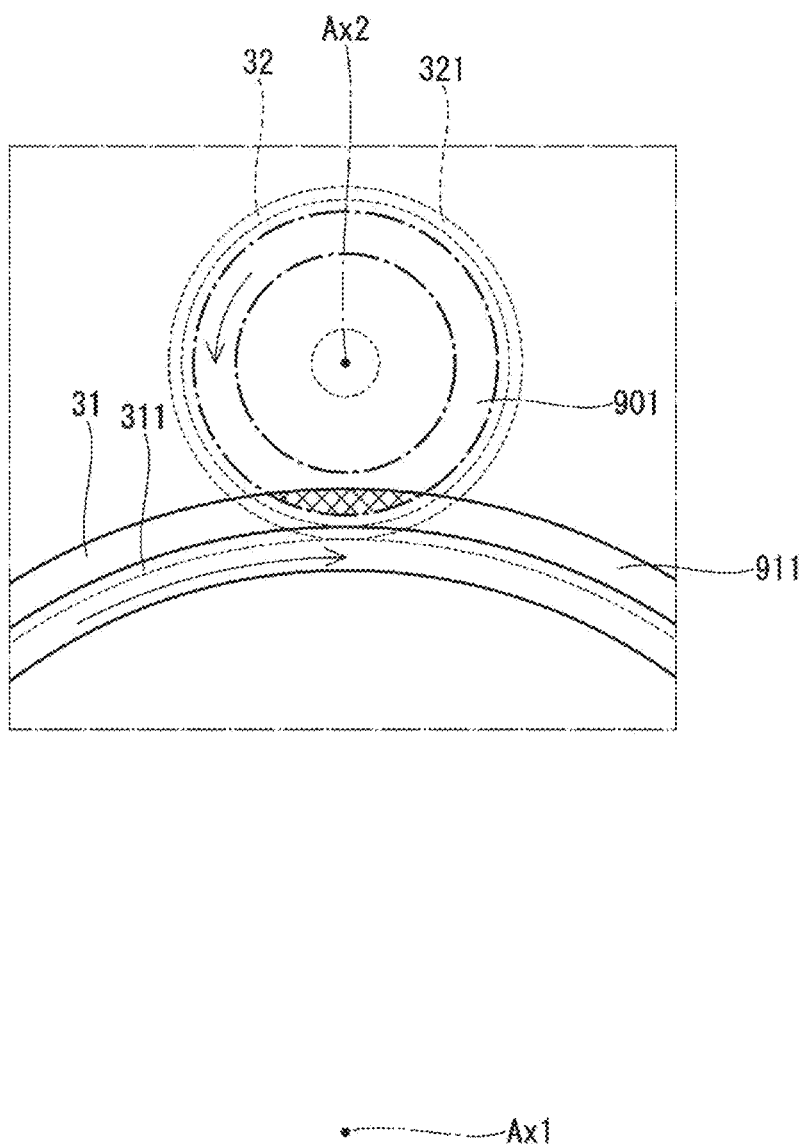
FIG. 4 is a schematic diagram showing a planetary gear and its vicinity at the geared motor according to the first embodiment.

As shown in FIGS. 3 and 4, in the present embodiment, when the sun gear 31 is rotated by the torque transmitted from the electric motor 20, each planetary gear 32 is rotated and is revolved around the sun gear 31 in the circumferential direction of the sun gear 31 while the planetary gear 32 meshes with the sun gear 31. At this time, the portion of the first planetary gear annular surface 901 and the portion of the sun gear annular surface 911 can slide relative to each other in the rotational direction of the planetary gear 32 (see the area shaded with the mesh in FIG. 4). The sliding speed at this time is very low. Furthermore, at this time, the portion of the second planetary gear annular surface 902 and the portion of the output-side annular surface 921 can slide relative to each other in the rotational direction of the planetary gear 32. The sliding speed at this time is also very low.

Figure 5:
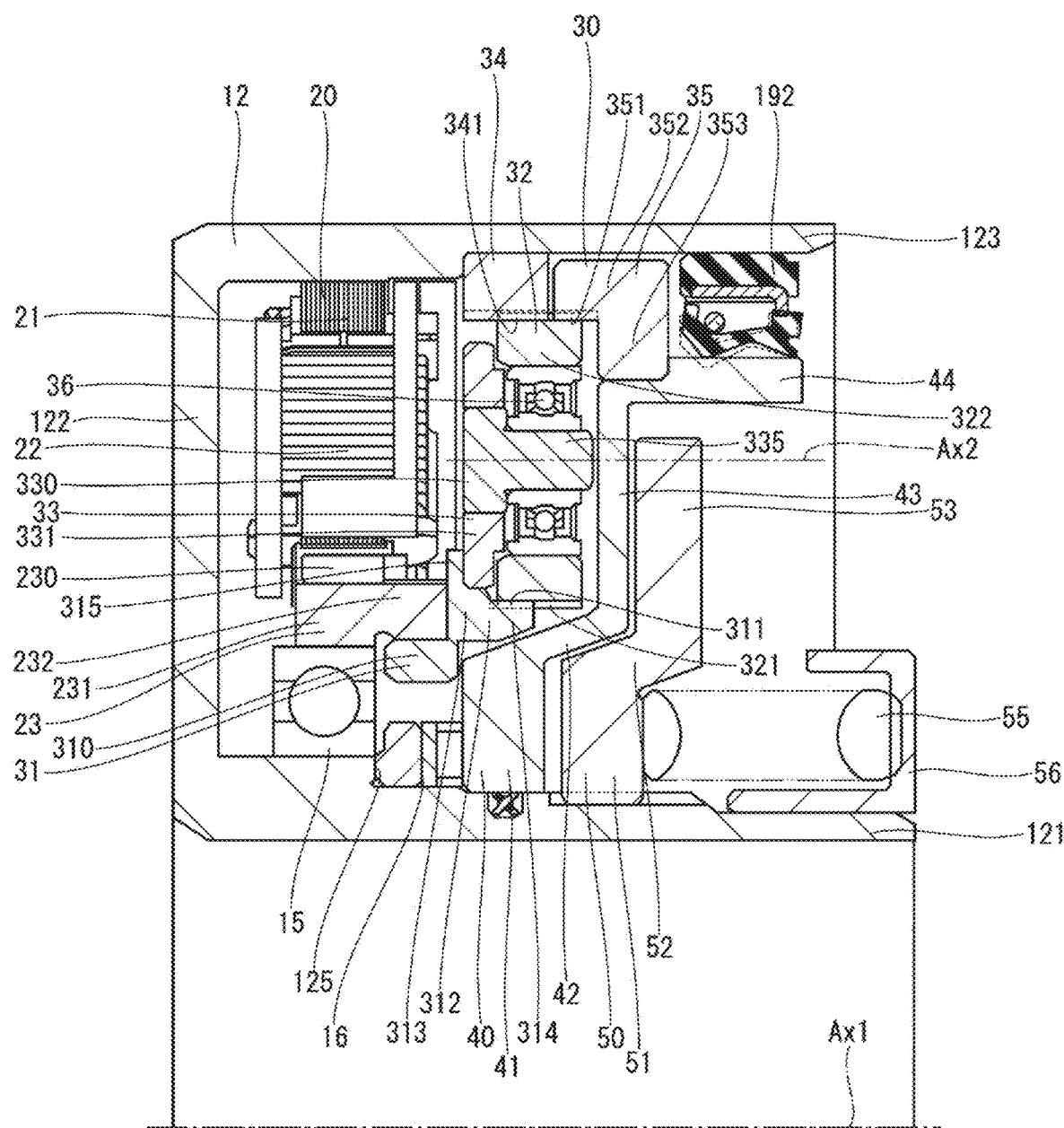
FIG. 5 is a cross-sectional view showing a portion of a clutch actuator of a comparative example.
Figure 6:
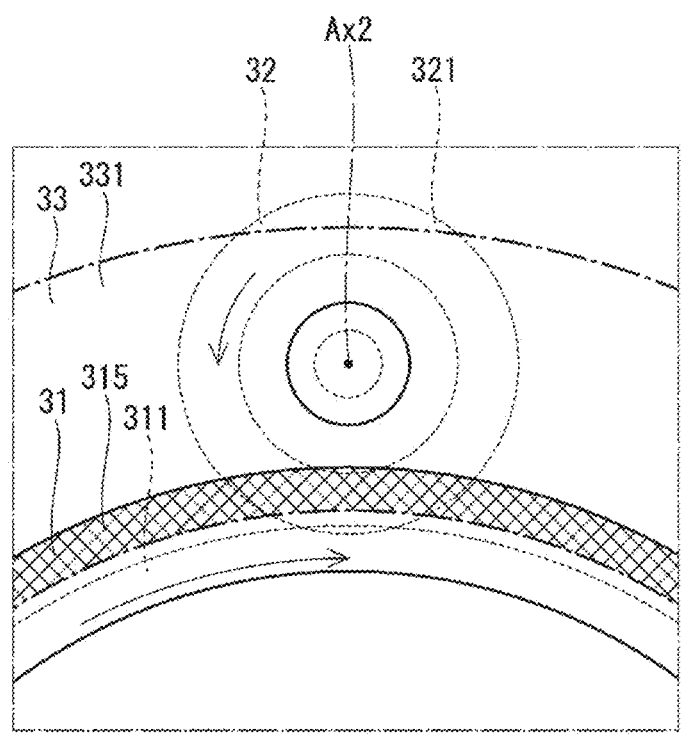
FIG. 6 is a schematic diagram showing a planetary gear and its vicinity at a geared motor of the comparative example.

As shown in FIGS. 5 and 6, in a geared motor of a comparative example, each planetary gear 32 does not include the first projection 323, the second projection 324, the first planetary gear annular surface 901 and the second planetary gear annular surface 902. Furthermore, the sun gear annular surface 911 and the output-side annular surface 921 are not formed.

An inner periphery of a portion of the end surface of the carrier main body 331, which is located on the coil 22 side, is abuttable against and is slidable relative to a portion of the surface of the sun gear extension 315, which is located on the planetary gear 32 side. Therefore, in the comparative example, when the sun gear 31 is rotated by the torque transmitted from the electric motor 20, each planetary gear 32 is rotated and is revolved around the sun gear 31 in the circumferential direction of the sun gear 31 while the planetary gear 32 meshes with the sun gear 31, and the carrier main body 331 is rotated relative to the sun gear 31 at the location that is on the radially outer side of the sun gear 31. At this time, the inner periphery of the end surface of the carrier main body 331 located on the coil 22 side can slide relative to the surface of the sun gear extension 315 located on the planetary gear 32 side in the rotational direction of the carrier main body 331 (see an area shaded with a mesh in FIG. 6). The sliding speed at this time is relatively high. Furthermore, at this time, a distal end portion of the pin 335 and the drive cam plate portion 43 may possibly slide relative to each other in the rotational direction of the carrier main body 331. The sliding speed at this time is also relatively high. Therefore, the sliding stress is high, and sever wear may occur between the sun gear 31 and the carrier 33 and also between the pin 335 and the drive cam plate portion 43.

In contrast, according to the present embodiment, the sliding speed between the first planetary gear annular surface 901 and the sun gear annular surface 911 and the sliding speed between the second planetary gear annular surface 902 and the output-side annular surface 921 are very low, and thereby the sliding stress is small. Thus, the wear between the planetary gear 32 and the sun gear 31 or the second ring gear 35 can be limited.

Furthermore, in the present embodiment and the comparative example, the sun gear 31, the planetary gears 32, the second ring gear 35, and the drive cam 40 are strengthened by heat treatment. Furthermore, the carrier main body 331 and the pins 335 are not heat treated and thereby have lower strength in comparison to the sun gear 31, the planetary gears 32, the second ring gear 35 and the drive cam 40. Therefore, in the comparative example, in which the sun gear 31 having the high strength and the carrier main body 331 having the low strength slide relative to each other, and the drive cam 40 having the high strength and the pin 335 having the low strength slide relative to each other, the carrier main body 331 and the pin 335 may have the sever wear. In contrast, in the present embodiment, in which the planetary gear 32 having the high strength slides relative to the sun gear 31 having the high strength or the second ring gear 35 having the high strength, it is possible to limit the wear of the respective components.

For example, even in a case where no heat treatment is applied to the sun gear 31, the planetary gears 32, the second ring gear 35 and the drive cam 40, the amount of wear between planetary gear 32 and the sun gear 31 or between the planetary gear 32 and the second ring gear 35 in the present embodiment is about 1/10 of the amount of wear between the sun gear 31 and the carrier main body 331 and between the drive cam 40 and the pin 335 in the comparative example.

Furthermore, in a case where the heat treatment is applied to the planetary gears 32, the second ring gear 35 and the drive cam 40, the amount of wear between planetary gear 32 and the sun gear 31 or between the planetary gear 32 and the second ring gear 35 in the present embodiment is about 1/100 to 1/200 of the amount of wear between the sun gear 31 and the carrier main body 331 and between the drive cam 40 and the pin 335 in the comparative example.

Figure 7:
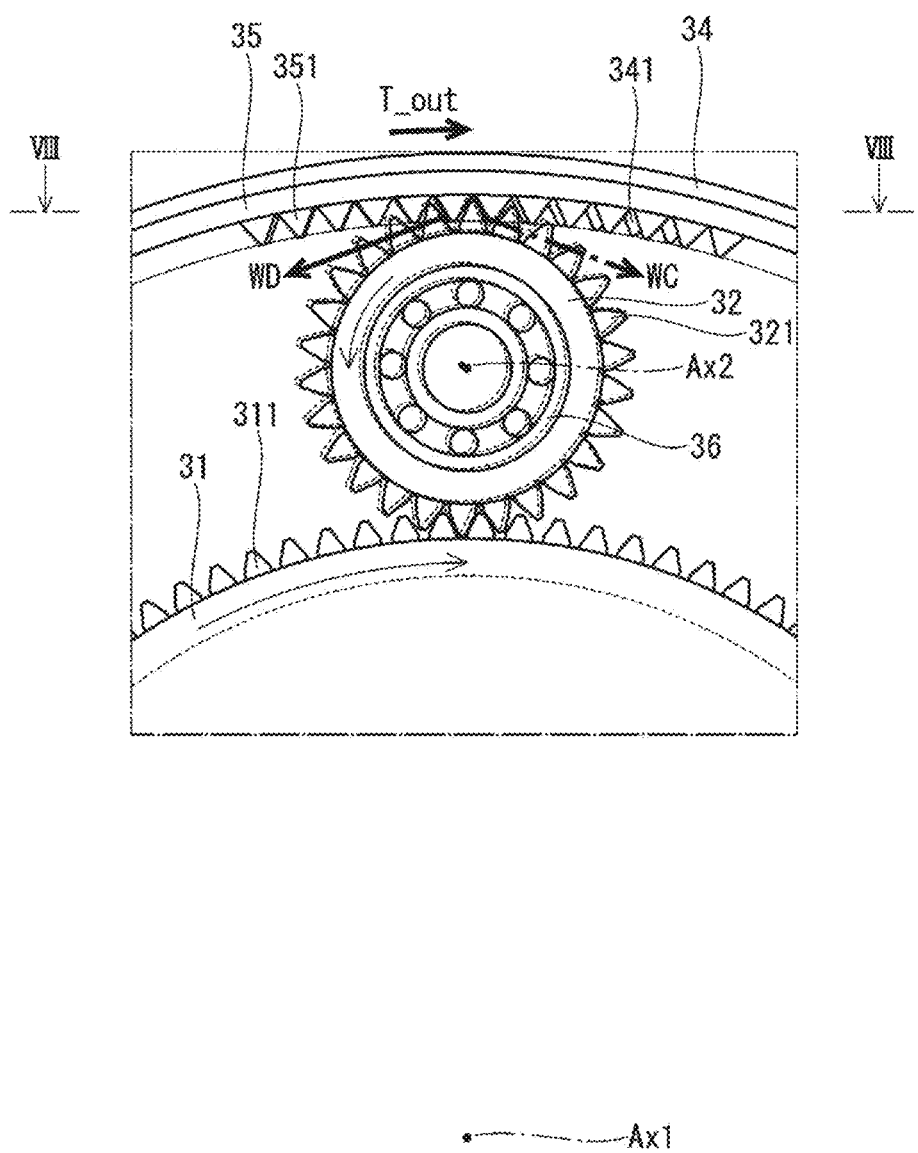
FIG. 7 is a diagram showing the planetary gear and its vicinity at the geared motor according to the first embodiment.
Figure 8:
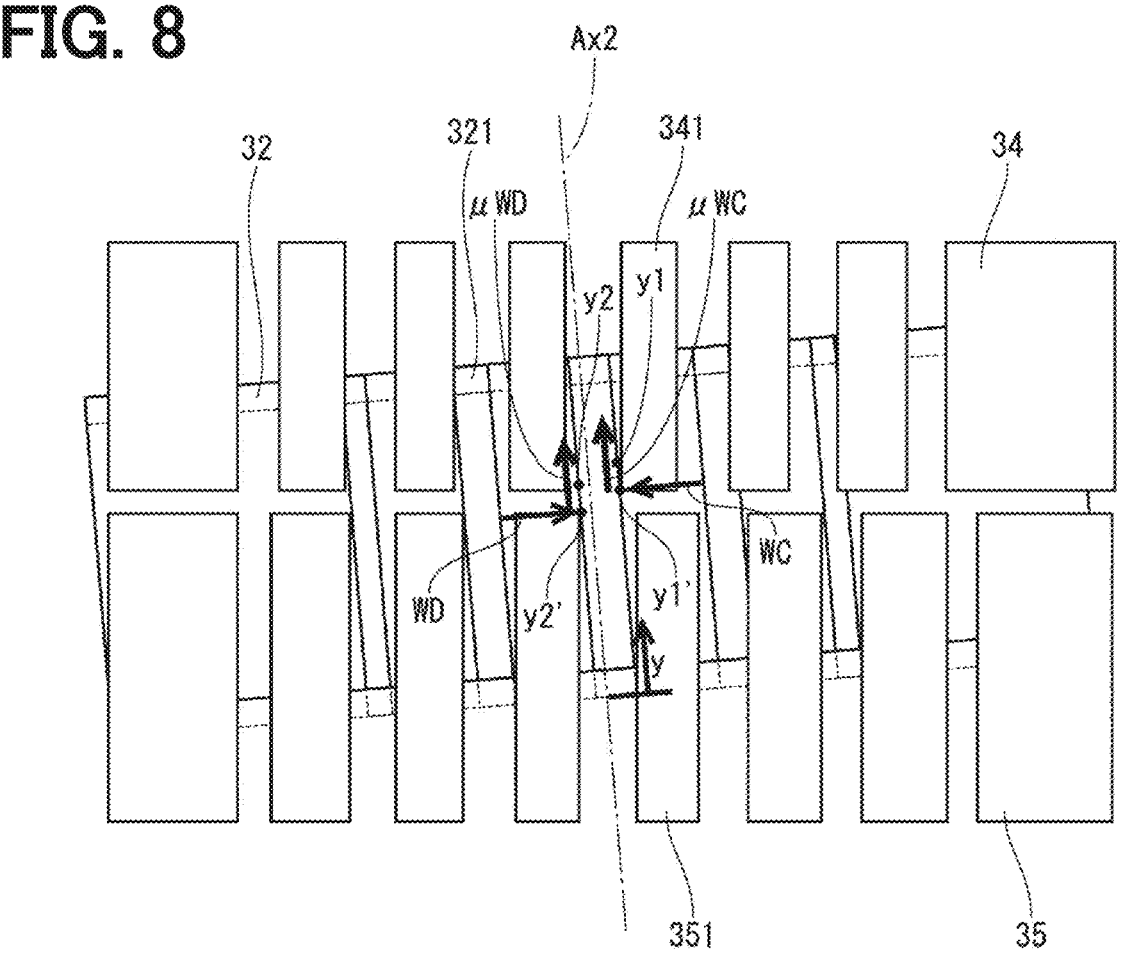
FIG. 8 is a cross-sectional view taken along line VIII-VIII n FIG. 7.

As shown in FIGS. 7 and 8, in a state where the planetary gear 32 is tilted due to rattling of the planetary gear bearing 36, when the sun gear 31 is rotated, contact portions between the planetary gear teeth 321 and the first ring gear teeth 341 and the contact portions between the planetary gear teeth 321 and the second ring gear teeth 351 slide relative to each other in the axial direction (direction indicated by y in FIG. 8). This direction is a direction of the clutch 70 relative to the planetary gear 32 at the coupling time, which is the time of shifting the clutch 70 from the decoupled state to the coupled state, and a direction of the electric motor 20 relative to the planetary gear 32 at the decoupling time, which is the time of shifting the clutch from the coupled state to the decoupled state. It is thought that an axial load, which is a load exerted in the axial direction at this time can be calculated as a product of the load acting on a tooth flank and a friction coefficient (p).

In FIGS. 7 and 8, there are indicated: a load WC applied from one of the first ring gear teeth 341 to the tooth flank of one of the planetary gear teeth 321; a load WD applied from one of the second ring gear teeth 351 to the tooth flank of one of the planetary gear teeth 321; a contact point y1 between the one of the first ring gear teeth 341 and the one of the planetary gear teeth 321 before the time of staring the sliding in the direction y; a contact point y1' between the one of the first ring gear teeth 341 and the one of the planetary gear teeth 321 during the time of sliding in the direction y; a contact point y2 between the one of the second ring gear teeth 351 and the one of the planetary gear teeth 321 before the time of staring the sliding in the direction y; and a contact point y2' between the one of the second ring gear teeth 351 and the one of the planetary gear teeth 321 during the time of sliding in the direction y. Frictional forces F1, F2, each of which is an axial load, are generated in an opposite direction that is opposite to a moving direction of the corresponding contact point of the planetary gear 32. Here, the frictional force F1 is expressed as F1=μ×WC, and the frictional force F2 is expressed as F2=μ×WD.

Figure 9:
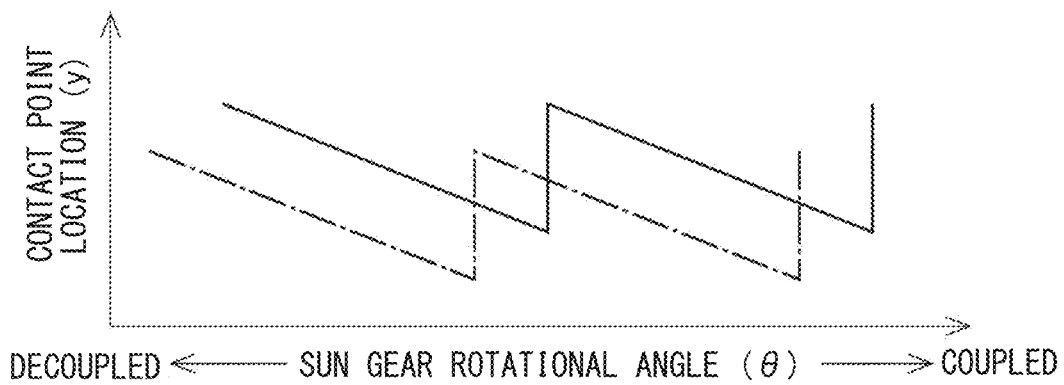
FIG. 9 is a diagram showing a relationship between a rotational angle of a sun gear and a contact point between the planetary gear and a first ring gear and a contact point between the planetary gear and a second ring gear.

FIG. 9 indicates a relationship between the rotational angle (θ) of the sun gear 31 and the location (y) of the contact point y1, y2. In FIG. 9, the location of the contact point y1 is indicated by a solid line, and the location of the contact point y2 is indicated by a dot-dash line.

Figure 10:
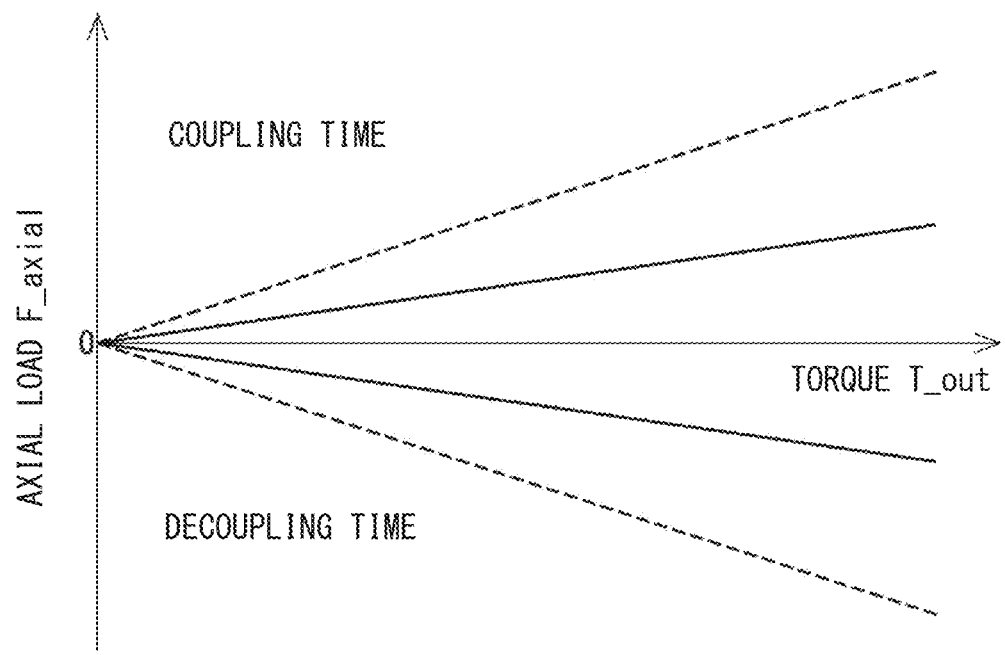
FIG. 10 is a diagram showing a relationship between a torque applied to the second ring gear and an axial load applied to a carrier.

FIG. 10 indicates a relationship between the torque T_out, which is the torque (load) applied to the second ring gear 35, and the axial load F_axial, which is applied to the carrier 33. In FIG. 10, the axial load at the time when the amount of tilt of the planetary gear bearing 36 is relatively small is indicated by a solid line, and the axial load at the time when the amount of tilt of the planetary gear bearing 36 is relatively large is indicated by a dotted line. As shown in FIG. 10, when the amount of tilt of the planetary gear bearing 36 is increased, an absolute value of the axial load is increased.

Figure 11:
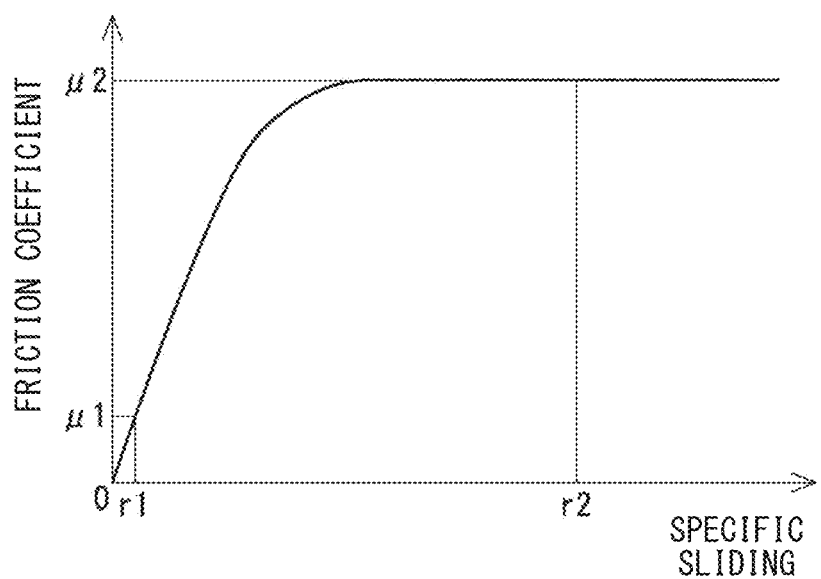
FIG. 11 is a diagram showing a relationship between a specific sliding and a friction coefficient between two components which make relative rotation therebetween.

FIG. 11 indicates a relationship between a specific sliding (also referred to as a specific sliding ratio) and a friction coefficient between two components which rotate relative to each other. In the comparative example, the specific sliding r2 between the sun gear 31 and the carrier main body 331 and between the drive cam 40 and the pin 335 is relatively large, and thereby the friction coefficient μ2 between the sun gear 31 and the carrier main body 331 and between the drive cam 40 and the pin 335 is relatively large. In contrast, in the present embodiment, the specific sliding r1 between the planetary gear 32 and the sun gear 31 or between the planetary gear 32 and the second ring gear 35 is significantly smaller in comparison to the specific sliding r2, and thereby the friction coefficient μ1 is significantly smaller in comparison to the friction coefficient μ2. Therefore, in the present embodiment, the amount of wear of the components can be significantly reduced in comparison to the comparative example.

As described above, in the present embodiment, the second ring gear 35 has the output-side annular surface 921 which is the annular surface, and the portion of the output-side annular surface 921 is opposed to the portion of the second planetary gear annular surface 902 such that the portion of the output-side annular surface 921 is abuttable against and is slidable relative to the portion of the second planetary gear annular surface 902. A relative movement of the carrier subassembly 330 relative to the housing 12 in the axial direction is limited when the first planetary gear annular surface 901 abuts against the sun gear annular surface 911 or when the second planetary gear annular surface 902 abuts against the output-side annular surface 921.

In the present embodiment, the position of the carrier subassembly 330 in the axial direction can be limited by the sun gear annular surface 911 of the sun gear 31 and the output-side annular surface 921 of the second ring gear 35. Here, the sliding speed between the first planetary gear annular surface 901 and the sun gear annular surface 911 and the sliding speed between the second planetary gear annular surface 902 and the output-side annular surface 921 are very low in comparison to the sliding speed between the carrier subassembly and the position limiting component of the previously proposed clutch actuator. Therefore, the sliding distance between the first planetary gear annular surface 901 and the sun gear annular surface 911 and the sliding distance between the second planetary gear annular surface 902 and the output-side annular surface 921 can be significantly reduced to significantly reduce the sliding stress. Therefore, the amount of wear of the planetary gears 32, the sun gear 31 and the second ring gear 35 can be reduced, and the wear resistance can be improved.

Furthermore, it is possible to reduce the torque loss between: the carrier subassembly 330; and the sun gear 31 and the second ring gear 35 (serving as the position limiting components). Therefore, the overall efficiency of the speed reducer 30 can be improved.

Furthermore, in the present embodiment, the outer diameter of each of the first planetary gear annular surface 901 and the second planetary gear annular surface 902 is set to be equal to or smaller than the diameter of the dedendum circle of the planetary gear 32. The outer diameter of the sun gear annular surface 911 is set to be equal to or larger than the diameter of the addendum circle of the sun gear 31. The inner diameter of the output-side annular surface 921 is set to be equal to or smaller than the diameter of the addendum circle of the second ring gear 35.

Therefore, at the time of assembling the planetary gear 32, the interference between the sun gear teeth 311 and the first planetary gear annular surface 901 and the interference between the second ring gear teeth 351 and the second planetary gear annular surface 902 can be avoided to improve the assemblability.

Furthermore, in the present embodiment, the outer diameter of the sun gear annular surface 911 and the inner diameter of the output-side annular surface 921 are sized to maintain the opposing state between the first planetary gear annular surface 901 and the sun gear annular surface 911 and the opposing state between the second planetary gear annular surface 902 and the output-side annular surface 921 even when the error occurs in the center-to-center distance between any two of the center of the sun gear 31, the center of the planetary gear 32, the center of the first ring gear 34 and the center of the second ring gear 35.

In this way, even when the error occurs in the center-to-center distance between any two of the center of the sun gear 31, the center of the planetary gear 32, the center of the first ring gear 34 and the center of the second ring gear 35, it is possible to limit removal of the planetary gear 32 between the sun gear annular surface 911 and the output-side annular surface 921, and thereby the position of the carrier subassembly 330 in the axial direction can be appropriately and continuously limited by the sun gear annular surface 911 and the output-side annular surface 921.

Furthermore, according to the present embodiment, there is provided the clutch actuator 10 for the clutch device 1 that includes the clutch 70 which is configured to shift the state of the clutch 70 between: the coupled state, in which the torque is transmittable between the input shaft 61 and the output shaft 62 which are rotatable relative to each other; and the decoupled state, in which transmission of the torque between the input shaft 61 and the output shaft 62 is blocked; and the clutch actuator 10 includes the geared motor 7 and the torque cam 2 described above. The torque cam 2 includes the drive cam 40 and can convert the rotating motion of the drive cam 40 into the translating motion, which is the relative movement relative to the housing 12 in the axial direction to shift the state of the clutch 70 to the coupled state or the decoupled state.

In the clutch actuator, a high load is applied to, for example, the planetary gear at the time of coupling the clutch. Therefore, in the previously proposed clutch actuator, the amount of wear of the components is increased, and the supply of the electric current to the electric motor is increased to possibly deteriorate the efficiency and the reliability. In contrast, the clutch actuator 10 of the present embodiment includes the geared motor 7 described above. Therefore, the amount of wear of the components can be reduced, and the supply of the electric current supplied to the electric motor 20 can be reduced, and thereby the efficiency and the reliability can be improved.

Second Embodiment

Figure 12:
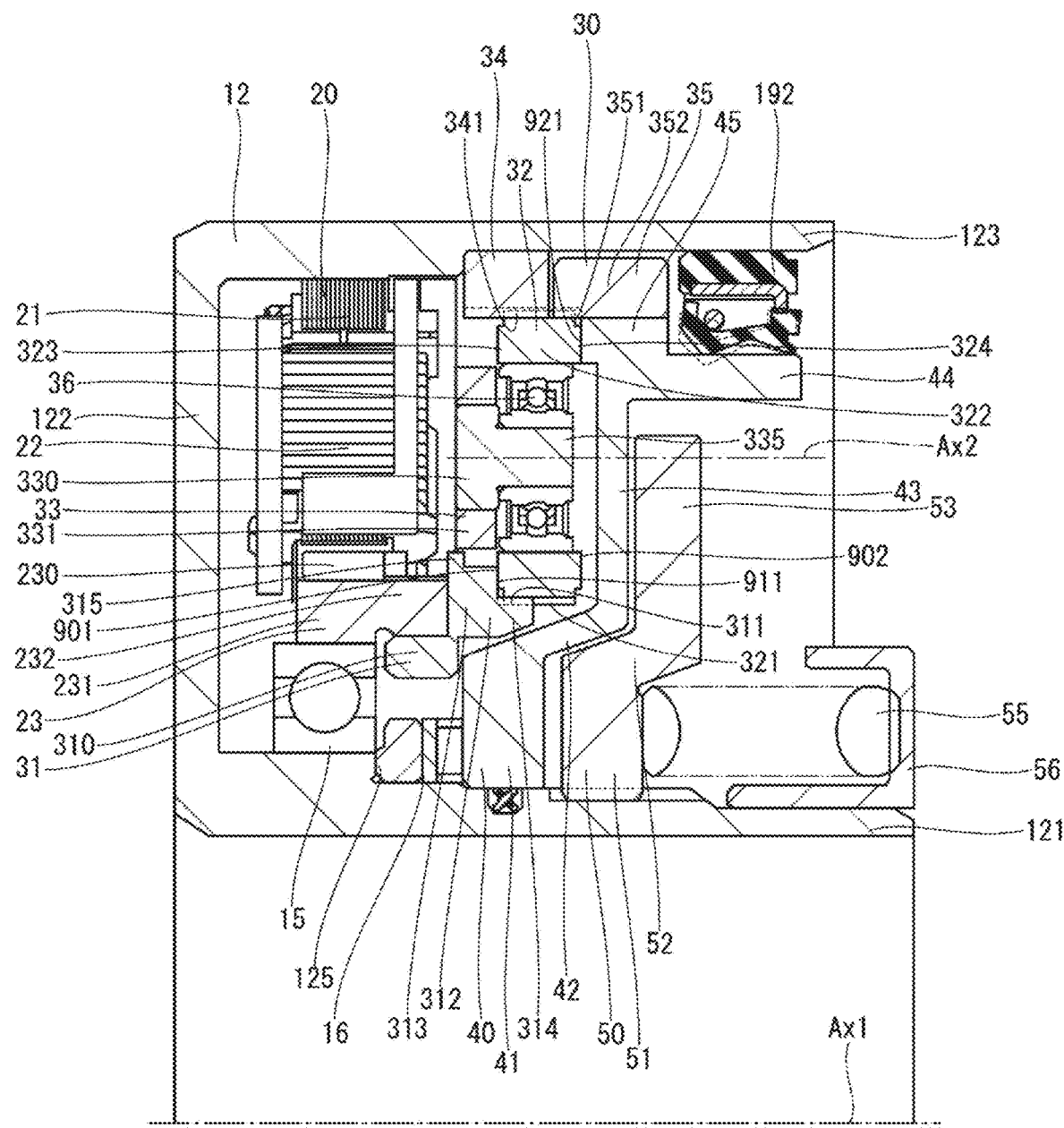
FIG. 12 is a cross-sectional view showing a portion of a clutch actuator according to a second embodiment.

FIG. 12 shows a portion of a geared motor and a clutch actuator according to a second embodiment. The second embodiment differs from the first embodiment with respect to the structures of the second ring gear 35 and the drive cam 40.

In the present embodiment, the second ring gear 35 does not include the second ring gear extension 353. Therefore, since the second ring gear 35 includes the second ring gear main body 352 shaped in the tubular form as its main constituent component, the configuration of the second ring gear 35 has a simple shape and can be easily manufactured by, for example, press-working.

The drive cam 40 includes a drive cam outermost tubular portion 45. The drive cam outermost tubular portion 45 is shaped in a tubular form and is formed integrally with the outer periphery of the drive cam plate portion 43 in one-piece. Here, an end portion of the drive cam outermost tubular portion 45, which is located on the planetary gear 32 side, projects toward the planetary gears 32 relative to an end surface of the drive cam plate portion 43 located on the planetary gear 32 side. The end surface of the drive cam outermost tubular portion 45, which is located on the planetary gear 32 side, is formed as an annular flat surface.

The second ring gear 35 is formed to rotate integrally with the drive cam 40 such that an inner peripheral wall of a portion of the second ring gear main body 352, which is opposite to the second ring gear teeth 351, is fitted to an outer peripheral wall of the drive cam outermost tubular portion 45.

The drive cam 40 has the output-side annular surface 921 which is an annular surface, and a portion of the output-side annular surface 921 is opposed to a portion of the second planetary gear annular surface 902 such that the portion of the output-side annular surface 921 is abuttable against and is slidable relative to the portion of the second planetary gear annular surface 902.

The output-side annular surface 921 is formed at an end surface of the drive cam outermost tubular portion 45, which is located on the planetary gear 32 side. Therefore, the output-side annular surface 921 is formed as the annular flat surface. A portion of the output-side annular surface 921 is opposed to a portion of the second planetary gear annular surface 902 such that the portion of the output-side annular surface 921 is abuttable against and is slidable relative to the portion of the second planetary gear annular surface 902. Therefore, when viewed in the axial direction of the planetary gear 32, the portion of the output-side annular surface 921 and the portion of the second planetary gear annular surface 902 overlap with each other.

A relative movement of the carrier subassembly 330 relative to the housing 12 in the axial direction is limited when the first planetary gear annular surface 901 abuts against the sun gear annular surface 911 or when the second planetary gear annular surface 902 abuts against the output-side annular surface 921.

Therefore, the position of the carrier subassembly 330 in the axial direction can be limited by the sun gear annular surface 911 of the sun gear 31 and the output-side annular surface 921 of the drive cam 40.

As described above, in the present embodiment, the drive cam 40 has the output-side annular surface 921 which is the annular surface, and the portion of the output-side annular surface 921 is opposed to the portion of the second planetary gear annular surface 902 such that the portion of the output-side annular surface 921 is abuttable against and is slidable relative to the portion of the second planetary gear annular surface 902. A relative movement of the carrier subassembly 330 relative to the housing 12 in the axial direction is limited when the first planetary gear annular surface 901 abuts against the sun gear annular surface 911 or when the second planetary gear annular surface 902 abuts against the output-side annular surface 921.

Therefore, the advantages, which are similar to those of the first embodiment, can be achieved.

Third Embodiment

Figure 13:
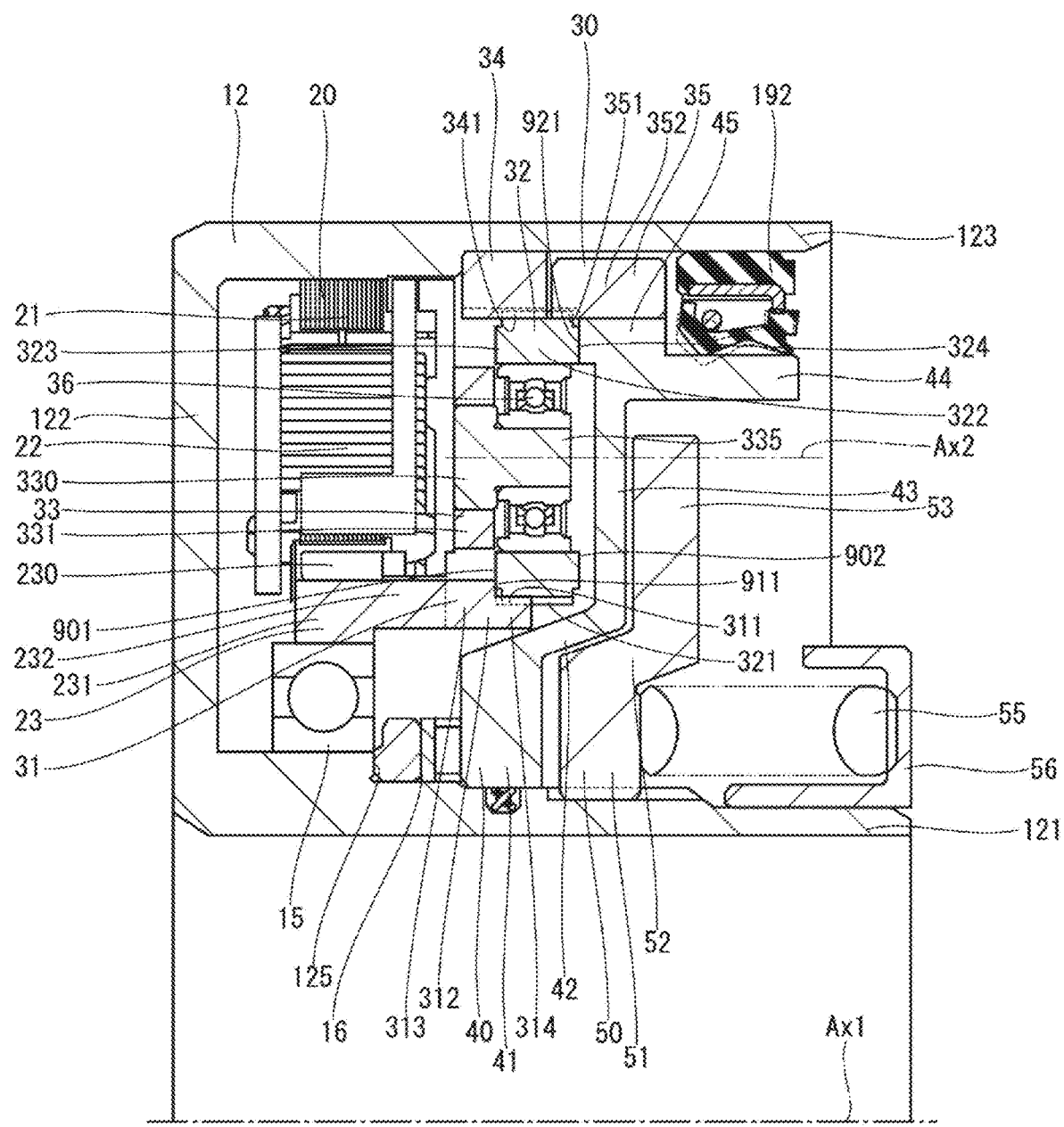
FIG. 13 is a cross-sectional view showing a portion of a clutch actuator according to a third embodiment.

FIG. 13 shows a portion of a geared motor and a clutch actuator according to a third embodiment. The third embodiment differs from the second embodiment with respect to the structures of the rotor 23 and the sun gear 31.

In the present embodiment, the rotor 23 and the sun gear 31 are formed integrally in one-piece by a common member. The sun gear 31 does not have the sun gear base 310 and the sun gear extension 315. The rotor 23 and the sun gear 31 are formed integrally in one-piece in a tubular form as a whole by joining the rotor tubular portion 232, the sun gear tubular portion 312 and the sun gear large diameter portion 313.

In the present embodiment, the sun gear extension 315 which is required in the comparative example to limit the movement of the carrier 33 in the axial direction, is not required, and thereby the structure of the sun gear 31 can be simplified. Furthermore, by integrally forming the rotor 23 and the sun gear 31 in one-piece, the shapes of the components can be simplified, and the number of the components can be reduced.

Fourth Embodiment

Figure 14:
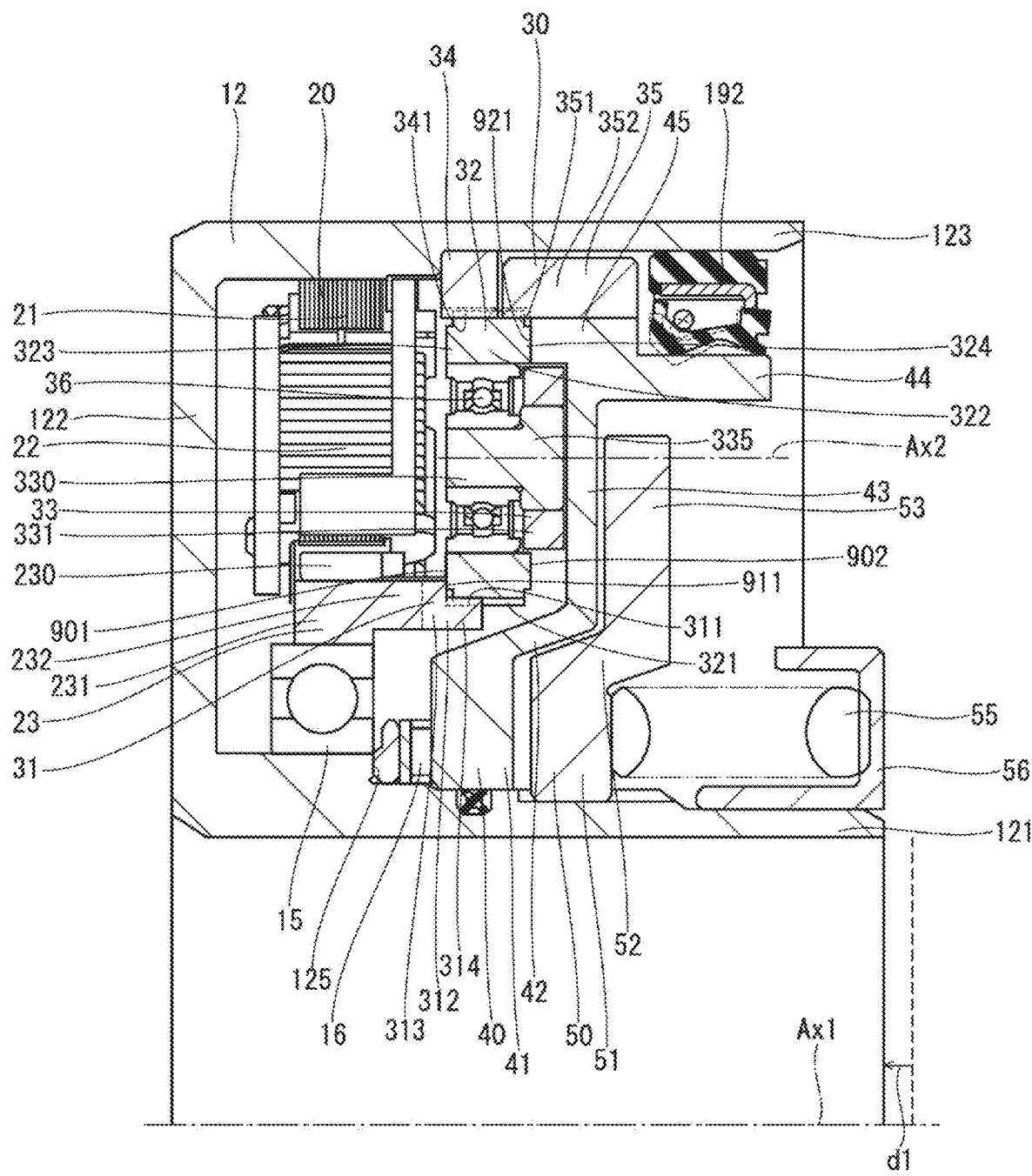
FIG. 14 is a cross-sectional view showing a portion of a clutch actuator according to a fourth embodiment.

FIG. 14 shows a portion of a geared motor and a clutch actuator according to a fourth embodiment. The fourth embodiment differs from the third embodiment with respect to the structure of the carrier 33.

In the present embodiment, the carrier 33 is located on the drive cam 40 side of an axial center of each planetary gear 32.

More specifically, the carrier main body 331 of the carrier 33 is located on the side of the axial center of the planetary gear main body 322, at which the drive cam plate portion 43 of the drive cam 40 is placed, at a location between the drive cam specific shape portion 42 and the drive cam outermost tubular portion 45.

Therefore, in comparison to the third embodiment, each planetary gear 32 can be displaced toward the coils 22 by the amount that corresponds to the plate thickness of the carrier main body 331, and thereby an axial length of the clutch actuator 10 can be reduced by a length d1.

A predetermined gap is formed between: the carrier main body 331 and each pin 335; and the drive cam plate portion 43. Therefore, the carrier main body 331 and each pin 335 cannot abut against and slide relative to the drive cam plate portion 43.

In the present embodiment, the carrier 33 is made of a magnetic material.

As described above, in the present embodiment, the carrier 33 is located on the drive cam 40 side of the axial center of each planetary gear 32. Thus, the planetary gears 32 can be placed closer to the coils 22, and the axial length of the clutch actuator 10 can be reduced.

Furthermore, in the present embodiment, the carrier 33 is made of the magnetic material.

When the carrier 33 is made of the magnetic material and is placed on the coil 22 side of the axial center of each planetary gear 32, the magnets 230 of the electric motor 20 and the carrier 33 are placed closer to each other, and a load for magnetically attracting the carrier 33 toward the electric motor 20 may possibly be generated. In view of this point, according to the present embodiment, the carrier 33 is made of the magnetic material which has the excellent processability, and the carrier 33 is placed on the drive cam 40 side of the axial center of each planetary gear 32. Therefore, the costs of the member are reduced, and the generation of the above-described load can be limited.

Fifth Embodiment

Figure 15:
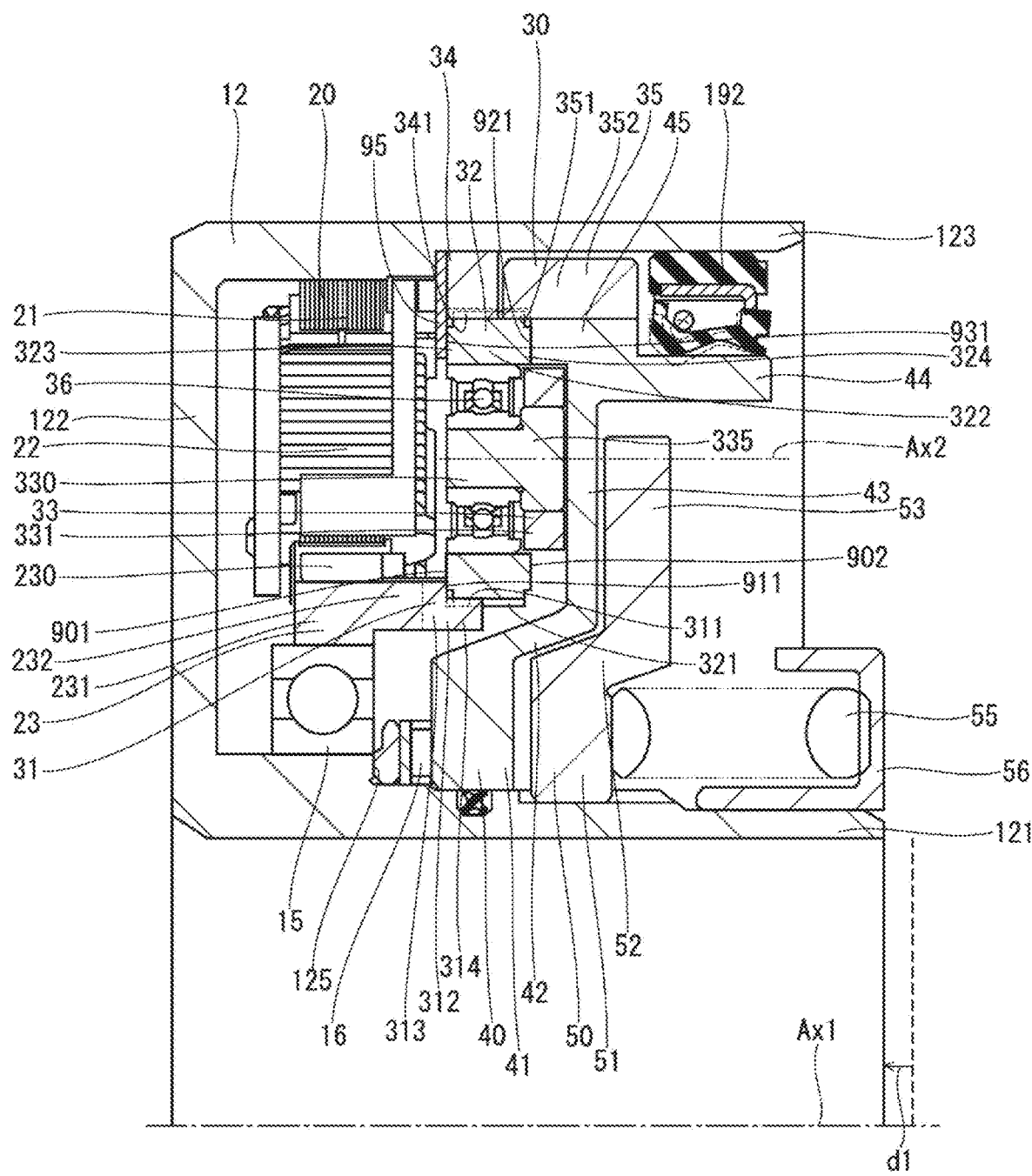
FIG. 15 is a cross-sectional view showing a portion of a clutch actuator according to a fifth embodiment.

FIG. 15 shows a portion of a geared motor and a clutch actuator according to a fifth embodiment. The fifth embodiment differs from the fourth embodiment with respect to the structures around the first ring gear 34.

In the present embodiment, there is further provided a plate 95 which is shaped in an annular form and is placed on the opposite side of the first ring gear 34 which is opposite to the second ring gear 35.

More specifically, the plate 95 is made of, for example, metal and is shaped in an annular plate form. The plate 95 is arranged such that an outer periphery of the plate 95 is clamped between: the step surface, which is formed at the inner peripheral wall of the housing outer tubular portion 123; and the first ring gear 34.

The plate 95 has a plate annular surface 931, which is an annular surface. A portion of the plate annular surface 931 is opposed to the first planetary gear annular surface 901 such that the portion of the plate annular surface 931 is abuttable against and is slidable relative to the first planetary gear annular surface 901.

More specifically, the plate annular surface 931 is formed as an annular flat surface at an inner periphery of the end surface of the plate 95 located on the side where the first ring gear 34 and the planetary gears 32 are placed.

A relative movement of the carrier subassembly 330 relative to the housing 12 in the axial direction is limited when the first planetary gear annular surface 901 abuts against the plate annular surface 931 or when the second planetary gear annular surface 902 abuts against the output-side annular surface 921.

Therefore, the position of the carrier subassembly 330 in the axial direction can be limited by the sun gear annular surface 911 of the sun gear 31 and the plate annular surface 931 of the plate 95, and the output-side annular surface 921 of the second ring gear 35.

Figure 16:
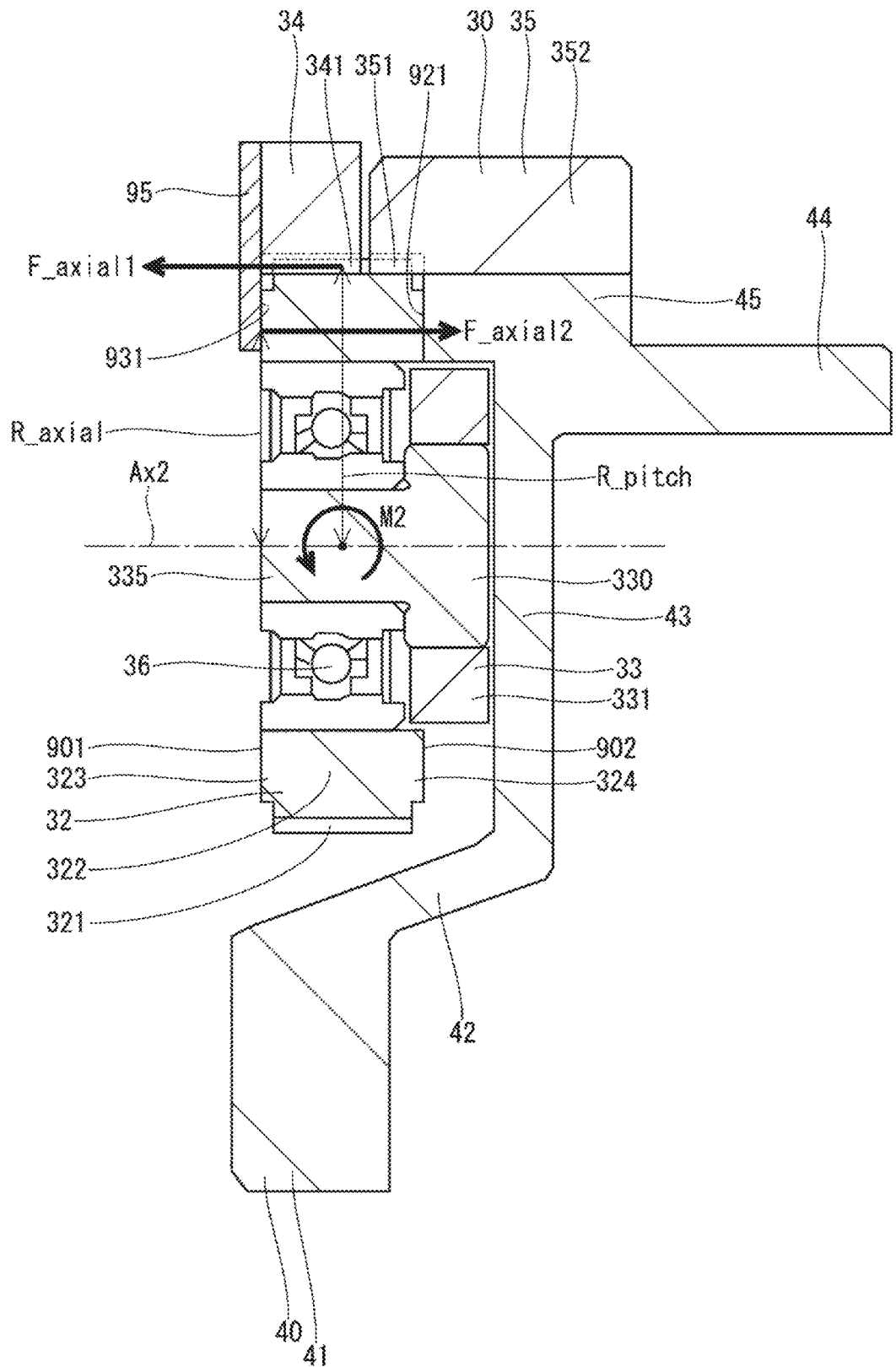
FIG. 16 is a diagram showing a planetary gear and its vicinity of a clutch actuator according to a fifth embodiment.

As shown in FIG. 16, when an axial load F_axial1 is applied from one of the second ring gear teeth 351 or one of the first ring gear teeth 341 to one of the planetary gear teeth 321, an axial load F_axial2, which is substantially equal to the axial load F_axial1, is applied from the plate annular surface 931 to the output-side annular surface 921. The moment M2, which is applied to the planetary gear 32, is expressed by: M2=R_axial×F_axial2−R_pitch×F_axial1.

Here, a distance R_pitch between the application point, at which the axial load F_axial1 is applied, and the axis Ax2 of the planetary gear 32, is substantially the same as a distance R_axial between the application point, at which the axial load F_axial2 is applied, and the axis Ax2 of the planetary gear 32 (i.e., R_axial R_pitch). Therefore, there exists the relationship of M2≈0, and thereby the moment is not substantially generated at the planetary gear 32.

As described above, in the present embodiment, there is provided the plate 95 that is shaped in the annular form and is placed on the opposite side of the first ring gear 34 which is opposite to the second ring gear 35. The plate 95 has the plate annular surface 931, which is the annular surface. The portion of the plate annular surface 931 is opposed to the first planetary gear annular surface 901 such that the portion of the plate annular surface 931 is abuttable against and is slidable relative to the first planetary gear annular surface 901. A relative movement of the carrier subassembly 330 relative to the housing 12 in the axial direction is limited when the first planetary gear annular surface 901 abuts against the plate annular surface 931 or when the second planetary gear annular surface 902 abuts against the output-side annular surface 921.

In the present embodiment, the position of the planetary gear 32 in the axial direction can be limited by clamping the first planetary gear annular surface 901 and the second planetary gear annular surface 902 between the plate annular surface 931 and the output-side annular surface 921. Therefore, the moment, which can be generated at the planetary gear 32, can be reduced. In this way, the stress, which is applied to the planetary gear bearing 36, is reduced, and the reliability can be improved.

Sixth Embodiment

Figure 17:
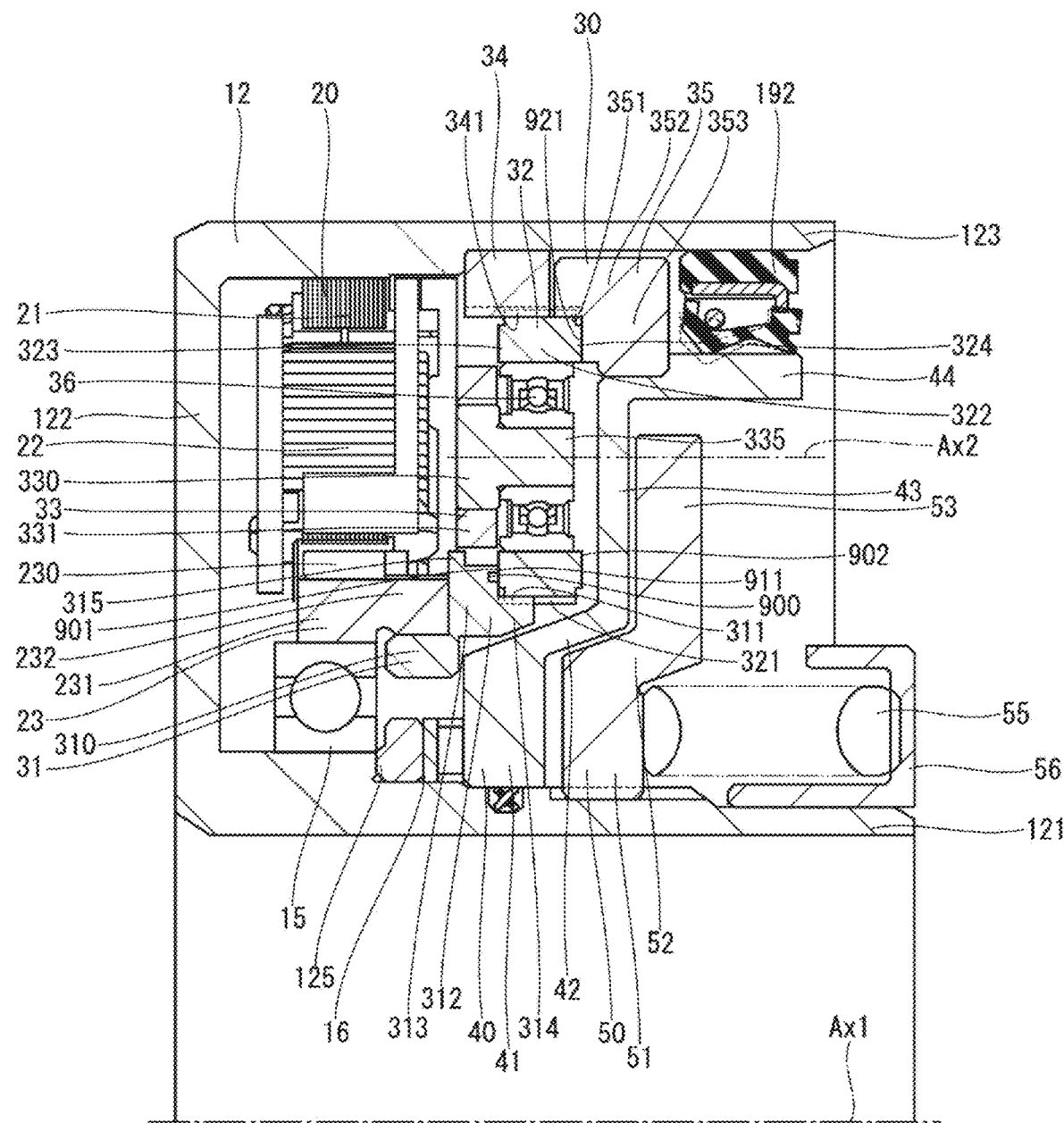
FIG. 17 is a cross-sectional view showing a portion of a clutch actuator according to a sixth embodiment.

FIG. 17 shows a portion of a geared motor and a clutch actuator according to a sixth embodiment. The sixth embodiment differs from the first embodiment with respect to the structure of the sun gear annular surface 911.

In the present embodiment, there is further provided an annular recess 900. The annular recess 900 is formed at the sun gear annular surface 911. The annular recess 900 is formed in an annular form such that the annular recess 900 is recessed toward the rotor 23 from the sun gear annular surface 911, i.e., a step surface is formed between the outer peripheral wall of the sun gear large diameter portion 313 and the outer peripheral wall of the sun gear small diameter portion 314.

By forming the annular recess 900 at the sun gear 31, the inertia of the sun gear 31 can be reduced, and the costs can be reduced.

Other Embodiments

In the above embodiments, there is described the example where the number of the planetary gears 32 is four. In contrast, in another embodiment, the number of the planetary gears 32 may be any number as long as the number of the planetary gears 32 is two or more. Here, it is desirable that the planetary gears 32 are arranged at equal intervals in the circumferential direction of the carrier 33.

Furthermore, in the embodiments described above, there is described the example where all of the planetary gears 32 have the first planetary gear annular surface 901 and the second planetary gear annular surface 902. In contrast, in another embodiment, only some (i.e., less than all) of the planetary gears 32 may have the first planetary gear annular surface 901 and the second planetary gear annular surface 902. In such a case, the number of machining operations for the first planetary gear annular surface 901 and the second planetary gear annular surface 902 can be reduced. For instance, in an exemplary case where the number of the planetary gears 32 is six, it is conceivable that only three of the six planetary gears 32 have the first planetary gear annular surface 901 and the second planetary gear annular surface 902. In such a case, it is desirable that the six planetary gears 32 are arranged at equal intervals in the circumferential direction of the carrier 33 such that one of the remaining three planetary gears 32, each of which does not have the first planetary gear annular surface 901 and the second planetary gear annular surface 902, is interposed between each two of the three planetary gears 32, each of which has the first planetary gear annular surface 901 and the second planetary gear annular surface 902.

Furthermore, in the sixth embodiment, there is described the example where the annular recess 900 is formed at the sun gear annular surface 911. In contrast, in another embodiment, the annular recess 900 may be formed to at least one of the first planetary gear annular surface 901, the second planetary gear annular surface 902, the sun gear annular surface 911 and the output-side annular surface 921. In this way, the inertia of the component(s) which has the annular recess 900, can be reduced, and the costs can be reduced.

Furthermore, in the embodiments described above, there is explained the example where the carrier is made of the magnetic material. In contrast, in another embodiment, the carrier may be made of a non-magnetic material, such as stainless steel.

Furthermore, in another embodiment, each of the number of the drive cam grooves 400 and the number of the driven cam grooves 500 can be any number that is equal to or larger than three. Furthermore, the number of the cam balls 3 may be any number that is in conformity with the number of the drive cam grooves 400 and the number of the driven cam grooves 500.

Furthermore, any two or more of the embodiments described above may be combined in any way as long as there are no inhibiting factors in the configuration.

The application of the present disclosure is not limited to the vehicle that is driven by the drive torque transmitted from the internal combustion engine. For example, the present disclosure may be applied to an electric vehicle and a hybrid vehicle that can be driven by a drive torque transmitted from an electric motor.

Furthermore, in another embodiment, the torque may be inputted from the second transmission element and may be outputted from the first transmission element through the clutch. Furthermore, in a case where one of the first transmission element and the second transmission element is non-rotatably fixed, by placing the clutch in the coupled state, the rotation of the other one of the first transmission element and the second transmission element can be stopped. In this case, the clutch device can be used as a brake device.

The geared motor of the present disclosure can be used not only as the motor unit of the clutch actuator but also as a motor unit of another device or a stand-alone motor.

As described above, the present disclosure is not limited to the embodiments described above and can be implemented in various forms without departing from the spirit of the present disclosure.

The controller unit and its method of the clutch device of the present disclosure may be realized by a dedicated computer that is provided by configuring at least one processor and a memory programmed to perform one or more functions embodied by a computer program. Alternatively, the controller unit and its method of the clutch device of the present disclosure may be realized by a dedicated computer that is provided by configuring at least one processor with one or more dedicated hardware logic circuits. Further alternatively, the controller unit and its method of the clutch device of the present disclosure may be realized by one or more dedicated computers that are provided by configuring a combination of (A) a processor programmed to perform one or more functions and a memory and (B) a processor composed of one or more hardware logic circuits. Further, the computer program may also be stored in a computer-readable, non-transitory, tangible storage medium as instructions to be executed by a computer.

The present disclosure has been described with reference to the embodiments. However, the present disclosure is not limited to the above embodiments and the structures described therein. The present disclosure also includes various variations and variations within the equivalent range. Also, various combinations and forms, as well as other combinations and forms that include only one element, more, or less, are within the scope and ideology of the present disclosure.

What is claimed is:

1. A geared motor comprising:
a housing;
an electric motor that is installed to the housing and is configured to output a torque of rotation in response to supply of an electric power to the electric motor;
a speed reducer that is configured to output the torque of the rotation transmitted from the electric motor after reducing a rotational speed of the rotation; and
a rotary element that is configured to be rotated by the torque transmitted from the speed reducer, wherein:
the speed reducer includes:
a sun gear which is configured to receive the torque transmitted from the electric motor;
a plurality of planetary gears which are configured to mesh with the sun gear, wherein each of the plurality of planetary gears is configured to rotate and revolve around the sun gear in a circumferential direction of the sun gear;
a plurality of pins each of which is installed at a rotational center of a corresponding one of the plurality of planetary gears;
a plurality of planetary gear bearings each of which is installed between a corresponding one of the plurality of planetary gears and a corresponding one of the plurality of pins;
a carrier which is shaped in an annular form and is rotatable relative to the sun gear, wherein the carrier supports one end portion of each of the plurality of pins and thereby rotatably supports each of the plurality of planetary gears;

a first ring gear which is shaped in an annular form and is configured to mesh with the plurality of planetary gears; and a second ring gear which is shaped in an annular form and is configured to mesh with the plurality of planetary gears, wherein a number of teeth of the second ring gear is different from a number of teeth of the first ring gear, and the second ring gear is configured to output the torque to the rotary element;

the plurality of planetary gears, the plurality of pins, the plurality of planetary gear bearings and the carrier form a carrier subassembly;

at least one planetary gear among the plurality of planetary gears has:
- a first planetary gear annular surface which is an annular surface formed at one axial end of the at least one planetary gear; and
- a second planetary gear annular surface which is an annular surface formed at another axial end of the at least one planetary gear that is opposite to the one axial end of the at least one planetary gear;

the sun gear has a sun gear annular surface that is an annular surface and is opposed to the first planetary gear annular surface such that a portion of the sun gear annular surface is abuttable against and is slidable relative to a portion of the first planetary gear annular surface;

one of the second ring gear and the rotary element has an output-side annular surface that is an annular surface and is opposed to the second planetary gear annular surface such that a portion of the output-side annular surface is abuttable against and is slidable relative to a portion of the second planetary gear annular surface;

a relative movement of the carrier subassembly relative to the housing in an axial direction is limited when the first planetary gear annular surface abuts against the sun gear annular surface or when the second planetary gear annular surface abuts against the output-side annular surface;

the at least one planetary gear has:
- a planetary gear main body that is shaped in a tubular form;
- a first projection that is shaped in a tubular form and projects from one axial end surface of the planetary gear main body; and
- a second projection that is shaped in a tubular form and projects from another axial end surface of the planetary gear main body which is opposite to the one axial end surface of the planetary gear main body;

the first planetary gear annular surface is formed at an end surface of the first projection; and the second planetary gear annular surface is formed an end surface of the second projection.

2. The geared motor according to claim 1, wherein:
an outer diameter of each of the first planetary gear annular surface and the second planetary gear annular surface is set to be smaller than a diameter of a dedendum circle of the at least one planetary gear;
an outer diameter of the sun gear annular surface is set to be equal to or larger than a diameter of an addendum circle of the sun gear; and
an inner diameter of the output-side annular surface is set to be equal to or smaller than a diameter of an addendum circle of the second ring gear.

3. The geared motor according to claim 1, further comprising a plate that is shaped in an annular form and is placed on an opposite side of the first ring gear which is opposite to the second ring gear, wherein:
the plate has a plate annular surface that is an annular surface and is opposed to the first planetary gear annular surface such that a portion of the plate annular surface is abuttable against and is slidable relative to the first planetary gear annular surface; and
the relative movement of the carrier subassembly relative to the housing in the axial direction is limited when the first planetary gear annular surface abuts against the plate annular surface or when the second planetary gear annular surface abuts against the output-side annular surface.

4. The geared motor according to claim 1, wherein an outer diameter of the sun gear annular surface and an inner diameter of the output-side annular surface are sized to maintain an opposing state between the first planetary gear annular surface and the sun gear annular surface and an opposing state between the second planetary gear annular surface and the output-side annular surface even when an error occurs in a center-to-center distance between any two of a center of the sun gear, the rotational center of the at least one planetary gear, a center of the first ring gear and a center of the second ring gear.

5. The geared motor according to claim 1, wherein the carrier is axially placed only on one side of the rotational center of the at least one planetary gear where the rotary element is placed.

6. The geared motor according to claim 5, wherein the carrier is made of a magnetic material.

7. The geared motor according to claim 1, further comprising at least one annular recess that is a recess which is shaped in an annular form and is formed to at least one of the first planetary gear annular surface, the second planetary gear annular surface, the sun gear annular surface and the output-side annular surface.

8. The geared motor according to claim 1, wherein some of the plurality of planetary gears have the first planetary gear annular surface and the second planetary gear annular surface.

9. A clutch actuator for a clutch device that includes a clutch installed between a first transmission element and a second transmission element, which are configured to rotate, while the clutch is configured to shift a state between:
a coupled state where transmission of a torque between the first transmission element and the second transmission element is enabled; and
a decoupled state where the transmission of the torque between the first transmission element and the second transmission element is blocked, the clutch actuator comprising:
the geared motor according to claim 1; and
a rotation-to-translation converter that includes the rotary element and is configured to convert the rotating motion of the rotary element into a translating motion that is a relative movement relative to the housing in the axial direction to shift the state of the clutch to the coupled state or the decoupled state.

* * * * *